(12) United States Patent
Ukai

(10) Patent No.: US 7,037,960 B2
(45) Date of Patent: May 2, 2006

(54) WOODY FORMED ARTICLE AND METHOD FOR PRODUCING THE SAME

(75) Inventor: Masanori Ukai, Nagoya (JP)

(73) Assignee: Nichiha Corporation, Aichi (JP)

( * ) Notice: Subject to any disclaimer, the term of this patent is extended or adjusted under 35 U.S.C. 154(b) by 274 days.

(21) Appl. No.: 10/220,965

(22) PCT Filed: Mar. 7, 2001

(86) PCT No.: PCT/JP01/01792

§ 371 (c)(1),
(2), (4) Date: Sep. 6, 2002

(87) PCT Pub. No.: WO01/66323

PCT Pub. Date: Sep. 13, 2001

(65) Prior Publication Data

US 2003/0111775 A1    Jun. 19, 2003

(30) Foreign Application Priority Data

Mar. 7, 2000 (JP) ............................. 2000-061792
Feb. 22, 2001 (JP) ............................. 2001-046442

(51) Int. Cl.
*C08L 1/00* (2006.01)
*C08L 97/02* (2006.01)
(52) U.S. Cl. .......................... 524/13; 524/14; 264/122; 264/177.13; 264/177.16
(58) Field of Classification Search ............. 524/13–14; 264/122, 177.13, 177.16
See application file for complete search history.

(56) References Cited

U.S. PATENT DOCUMENTS

| 4,474,846 A | * | 10/1984 | Doerer et al. ................ 442/415 |
| 5,200,128 A | * | 4/1993 | Kiss ............................ 264/113 |
| 5,288,772 A | * | 2/1994 | Hon ............................. 524/35 |

FOREIGN PATENT DOCUMENTS

| DE | 3113848 | * | 1/1983 |
| JP | 6-23717 | * | 2/1994 |
| JP | 7-108511 | * | 4/1995 |
| JP | 11-192635 | * | 7/1999 |

* cited by examiner

*Primary Examiner*—Peter Szekely
(74) *Attorney, Agent, or Firm*—Donald S. Dowden; Cooper & Dunham LLP

(57) ABSTRACT

A woody formed article, characterized as being produced by admixing a woody material W and, as a binding agent, a fibrous and/or ribbon shaped thermoplastic resin R which is easy to be intertwined with the woody material W, and molding the resultant mixture. The thermoplastic resin R is preferably admixed in a state of being heated and melted. A method for producing a woody formed material, characterized in that it comprises providing a mat M of a raw material mixture Mx of a woody material W and a fibrous and/or ribbon-shaped thermoplastic resin R and subjecting the mat M to heat pressing, or comprises, in admixing the woody material W with the above fibrous thermoplastic resin R, stretching and thinning the resin R by means of a hot wind and/or a cold wind pressure, and admixing homogeneously it with the woody material W by utilizing a negative pressure zone due to the hot wind and/or the cold wind, to prepare a mat M of a raw material mixture Mx, and then subjecting the mat M to pressing.

14 Claims, 23 Drawing Sheets

WOODY FORMED ARTICLE AND METHOD FOR PRODUCING THE SAME

FIELD OF THE INVENTION

The present invention relates to a woody formed article and method for producing the same.

BACKGROUND OF THE INVENTION

Up to now, to produce a woody formed article in which woody material such as wood powder and the like and thermoplastic resin are mixed, a method consisting of melting said thermoplastic resin by employing such as an extruder, heating and melting type kneader, and the like, adding woody material such as wood powder to said melted thermoplastic resin to mix, and forming the resulting mixture into a formed article by extrusion molding or a method consisting of hot-pressing a mixture of said woody material and chip or pellet of said thermoplastic resin has been provided. As said woody material, fine woody material such as crushed waste paper have been used besides said wood powder. The resulting woody formed article is useful as building boards and material for furniture.

In a case where said woody material is added to said melted thermoplastic resin at a high temperature and pressure as described above, many kinds of sugar, lignin and the like originally contained in said woody material come out in said melted thermoplastic resin and further said components coming out from said woody material are dispersed wholly in said melted thermoplastic resin by kneading action of the screw of an extruder and the like under a high pressure. As a result, a problem that said thermoplastic resin is degraded by said components has arisen, and in the case where said thermoplastic resin is degraded, desirable hardness and strength of the resulting formed article can not be ensured, and the resulting formed article has poor toughness to be brittle and further has poor weather resistance, causing chalking by being exposed to ultraviolet rays outdoors.

Further in a case where said thermoplastic resin chip or pellet is mixed in said woody material, it is difficult to mix uniformly said woody material and said thermoplastic resin under room temperature and in a case where crushed waste paper is used as a woody material, a light woody formed article which can be used in place of plywood, OSB, and the like which use thermosetting resin and have excellent strength is difficult to obtain since said crushed waste paper has a big specific surface area so that a big amount of thermoplastic resin as a binder is necessary and as a result the density of the resulting formed article becomes high.

DISCLOSURE OF THE INVENTION

To solve said problems of said conventional arts, the present invention provides a woody formed article produced by forming a mixture Mx of woody material W and fibrous and/or ribbon-shaped thermoplastic resin R.

It is desirable that said fibrous and/or ribbon-shaped thermoplastic resin R is heated to melt and then mixed with said woody material in a melted state. Further, said fibrous and/or ribbon-shaped thermoplastic resin R produced by using scrapped resin articles can be used in the present invention. Furthermore, said woody material is desirably wood flakes.

To produce said woody formed article, a raw material mixture Mx in which said woody material W and said fibrous and/or ribbon-shaped thermoplastic resin R are contained is press-molded. To put it concretely, said raw material mixture containing said woody material and fibrous and/or ribbon-shaped thermoplastic resin is strewed on a conveyer moving to a designated direction directly or on mold panels put on said conveyer to form mats and said mats are formed. Uneven patterns may be formed on one or both side(s) of said mats by embossing. Further, said raw material mixture is desirably prepared by mixing fibrous and/or ribbon-shaped thermoplastic resin being heated and melted in said woody material by extruding said thermoplastic resin in fibrous shape from an orifice of an extruder's die. Said woody material is desirably supplied continuously from one side or both sides to said melted, extruded thermoplastic resin to mix. Still further, said melted thermoplastic resin extruded from said orifice of said extruders' die in fibrous shape may be stretched and thinned by hot wind pressure and/or cold wind pressure and said stretched and thinned fibrous thermoplastic resin may be mixed in said woody material in a melted state. Said die of said extruder has desirably a plural number of orifices arranged in one or a plural number of row(s) and a plural number of dies may be equipped in said extruder. Generally the caliber of said orifice of said die is in the range of between 0.2 and 2.0 mm.

BRIEF DESCRIPTION OF DRAWINGS

FIG. 1 is a figure to illustrate a mixing process of fibrous thermoplastic resin and woody material.

FIG. 2 is a figure to illustrate a mixing process of fibrous thermoplastic resin and woody material in another embodiment.

FIG. 3 is an illustrating side view of a former.

FIG. 4 is an illustrating side view of a former in another embodiment.

FIG. 5 is an illustrating side view of a former in still another embodiment.

FIG. 6 is a figure showing a state in which melted fibrous thermoplastic resin is intertwined with and adheres to woody material.

FIG. 7 is a illustrating side view of still another former.

FIG. 8 is a figure to illustrate a producing process of a woody formed article in which mold panel, hot roll press, and cold roll press are used.

FIG. 9 is a figure to illustrate a producing process of a woody formed article in which hot roll press and cold roll press are used.

FIG. 10 is a front view illustrating a state before pressing.

FIG. 11 is a side view illustrating a pressing state.

FIG. 12 is a figure to illustrate the structure of a formed mat after hot-pressing.

FIG. 13 is a figure to illustrate a hot press machine.

FIG. 14 is a figure to illustrate a cold press machine.

FIG. 15 is a figure to illustrate extruding and discharging process of thermoplastic resin.

FIG. 16 is an illustrating cross-sectional view of an orifice of an die.

FIG. 17 is an illustrating figure showing arrangement of orifices of a die.

FIG. 18 is an illustrating figure showing the state in which melted thermoplastic resin is intertwined with and adheres to woody material.

FIG. 19 is a figure to illustrate the intertwining state of raw materials using a die having a plural number of orifices arranged in a plural number of rows.

FIG. 20 is a figure to illustrate the intertwining state of raw materials using a die having a plural number of orifices arranged in three rows.

FIG. 21 is a figure to illustrate stretching and thinning process of extruded, melted thermoplastic resin by blowing hot wind and cold wind.

FIG. 22 is a figure to illustrate stretching and thinning process by blowing hot wind and cold wind in another embodiment.

FIG. 23 is a figure to illustrate stretching and thinning process by blowing hot wind and cold wind in a case where a plural number of dies are arranged in a plural number of steps.

FIG. 24 is an illustrating figure of heating process of woody material.

FIG. 25 is an illustrating figure of mixing process of raw materials in a case where woody material supplying conveyers and dies are arranged in a plural number of steps.

FIG. 26 is an illustrating figure of another embodiment of woody material supplying conveyers.

FIG. 27 is an illustrating figure of woody material supplying conveyer in still another embodiment, FIG. 28 is an illustrating figure of woody material supplying conveyer in yet another embodiment.

[AN EXPLANATION OF CODES]

Figure 1:
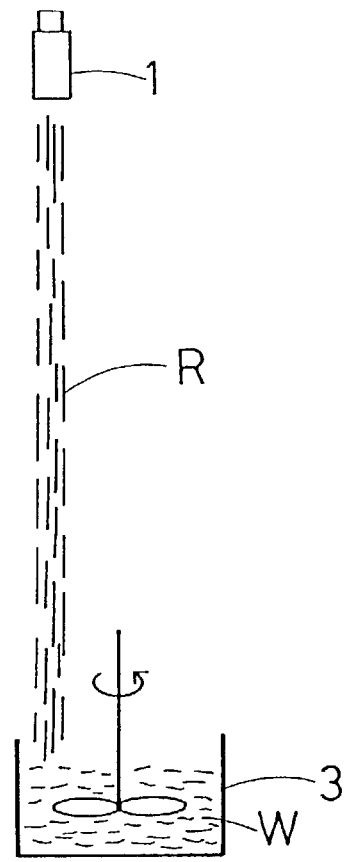
FIGS. 1 to 28 relate EMBODIMENT of the present invention.

| | |
|---|---|
| 7 | a conveyor |
| 10 | a mold panel |
| 13A, 14A | a compression roll press |
| 13B, 14B | a hot roll press |
| 13C, 14C | a cold roll press |
| 16A, 16B | an embossing roll |
| 42, 52, 62 | dies |
| 43 | an orifice |
| R | thermoplastic resin |
| W | a woody material (wood flakes) |
| Mx | a raw material mixture |
| M | a mat |
| M' | a formed mat |
| $\phi_1$ | an orifice's caliber |
| $\phi_2$ | a diameter of extruded thermoplastic resin after being stretched and thinned |

PREFERRED EMBODIMENT

[Woody Materials]

Woody materials W used in the present invention include such as wood flakes, strands, wood powder, sawdust, wood fiber bundles, wood pulp, and the like. Woody materials W made from waste pieces from cutting process or waste wood material produced when a wooden building is built or rebuilt or taken down can be used in the present invention. Up to now, said waste pieces and waste wood material have been incinerated but said incinerating treatment generates $CO_2$ gas causing temperature rise on the earth. Nevertheless, in the case where said waste pieces and waste wood material W are reused as woody material of the present invention, said environmental load can be reduced.

Wood flakes are especially preferable woody material of the present invention. Said wood flakes are prepared by using the Ring Flaker (Pallmann Co.) in thin leaf shape of preferably the width from 0.5 to 20 mm, the length from 1 to 50 mm, and thickness from 0.1 to 5 mm; more preferably the width from 0.5 to 10 mm, length from 4 to 35 mm, and thickness from 0.1 to 2.5 mm; ideally the width from 4 to 8 mm, length 20 to 25 mm, and thickness from 0.5 to 1 mm.

As described above, said woody material W can be made from waste wood material, and said waste wood materials produced in rebuilding and taking down are easily shaved into flake shape by the flaker. When said wood flake contains water, vapor is generated from said wood flake in the case of molding by heating and adhesion between said wood flake and said thermoplastic resin is obstructed by said vapor since vapor film is formed between said wood flake and said thermoplastic resin to obstruct said, so that said wood flake is dried with a dryer to reduce its water content to less than 5% after said wood flake is made from the wood material.

[Thermoplastic Resin]

Thermoplastic resin R for use in this invention includes polyethylene, polypropylene, ethylene/propylene copolymer, ethylene/propylene terpolymer, ethylene/vinyl acetate copolymer, poly vinyl chloride, poly vinylidene chloride, polystyrene, polyvinyl acetate, fluororesin, thermoplastic acrylic resin, thermoplastic polyester, thermoplastic polyamide, acrylonitrile/butadiene copolymer, styrene/butadiene copolymer, acrylonitrile/butadiene/styrene copolymer and the like, and waste articles made of said thermoplastic resin. Said thermoplastic resin R is used in the shape of fiber or ribbon. Said fibrous thermoplastic resin R is produced by such as a melt spinning method in which melted thermoplastic resin is extruded from the orifice of the extruder' die, a crushing method in which crushed waste articles made of said thermoplastic resin are split into fibrous shape with a refiner, and a splitting method in which waste articles made of said thermoplastic resin are split into fibrous shape with the refiner and waste articles of said thermoplastic resin are desirably used in said melt spinning method. Especially useful sources of said waste articles of said thermoplastic resin are such as thermoplastic resin sheets for agricultural use, thermoplastic resin bags for packing, thermoplastic resin fiber goods, cabinets for home-use electrical appliances, car bumpers, bottles made of polyethylene terephthalate and like since said thermoplastic resin articles produce a large quantity of waste articles.

Ribbon-shaped thermoplastic resin is produced by such as splitting thermoplastic resin film into ribbon-shape with a shredder, and waste thermoplastic resin film or thermoplastic resin film made from melted waste articles of thermoplastic resin by an extrusion method or a calender method is desirably used as said thermoplastic resin film. A mixture of two or more kinds of fibrous and/or ribbon-shaped thermoplastic resin R may be used or in a case where said thermoplastic resin is melted to spin or to form film, two or more kinds of thermoplastic resin R may be mixed to melt.

In the present invention, fibrous or ribbon-shaped thermoplastic resin R is used as a binder for said woody material W and in this case two or more kinds of thermoplastic resins can be mixed and used so that time and labor for sorting can be saved.

[Use of Waste Articles]

In the present invention, waste woody formed articles are cut and/or shaved, crushed or split to produce woody material W of said woody formed articles or woody cement boards. As described above, said woody formed articles of the present invention can be recycled in a high efficiency and indirectly said thermoplastic resin R can be recycled in a high efficiency. Moreover, since said woody formed articles of the present invention are used as building boards, material for furniture, mold panels of concrete and the like in large quantities, so that a large quantity of thermoplastic resin can be consumed to produce said woody formed article.

[Third Components]

Besides said woody material W and said fibrous and/or ribbon-shaped thermoplastic resin R, such as a water repellent agent, water proofing agent, antioxidant, coloring agent, agent giving a low viscosity, agent to improve adhesion and the like may be added to said woody formed article and in a case where two or more kinds of said thermoplastic resins R are mixed and melted and spun or formed into film, an agent to improve compatibility may be added.

[Production of Woody Formed Articles]

To produce said woody formed article of the present invention, first said woody material W and said fibrous and/or ribbon-shaped thermoplastic resin R are mixed together. Commonly, mixing ratio of said woody material W to said fibrous and/or ribbon-shaped thermoplastic resin R is settled to be in the range of between about 30:70 and 90:10 in weight ratio.

In said mixing process since said fibrous and/or ribbon-shaped thermoplastic resin R is/are, intertwined with said woody material W, said thermoplastic resin R and said woody material W can be uniformly mixed without separating. Further, air is dragged into the mixture of said thermoplastic resin R and said woody W material, and as a result, said mixture can contain plenty of air.

Figure 2:
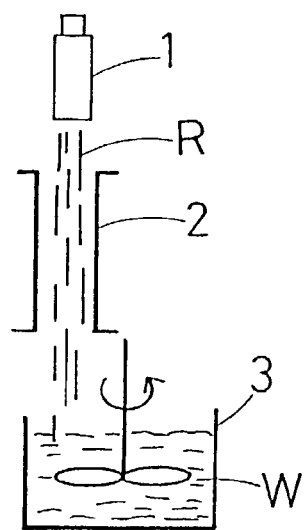
Figure 3:
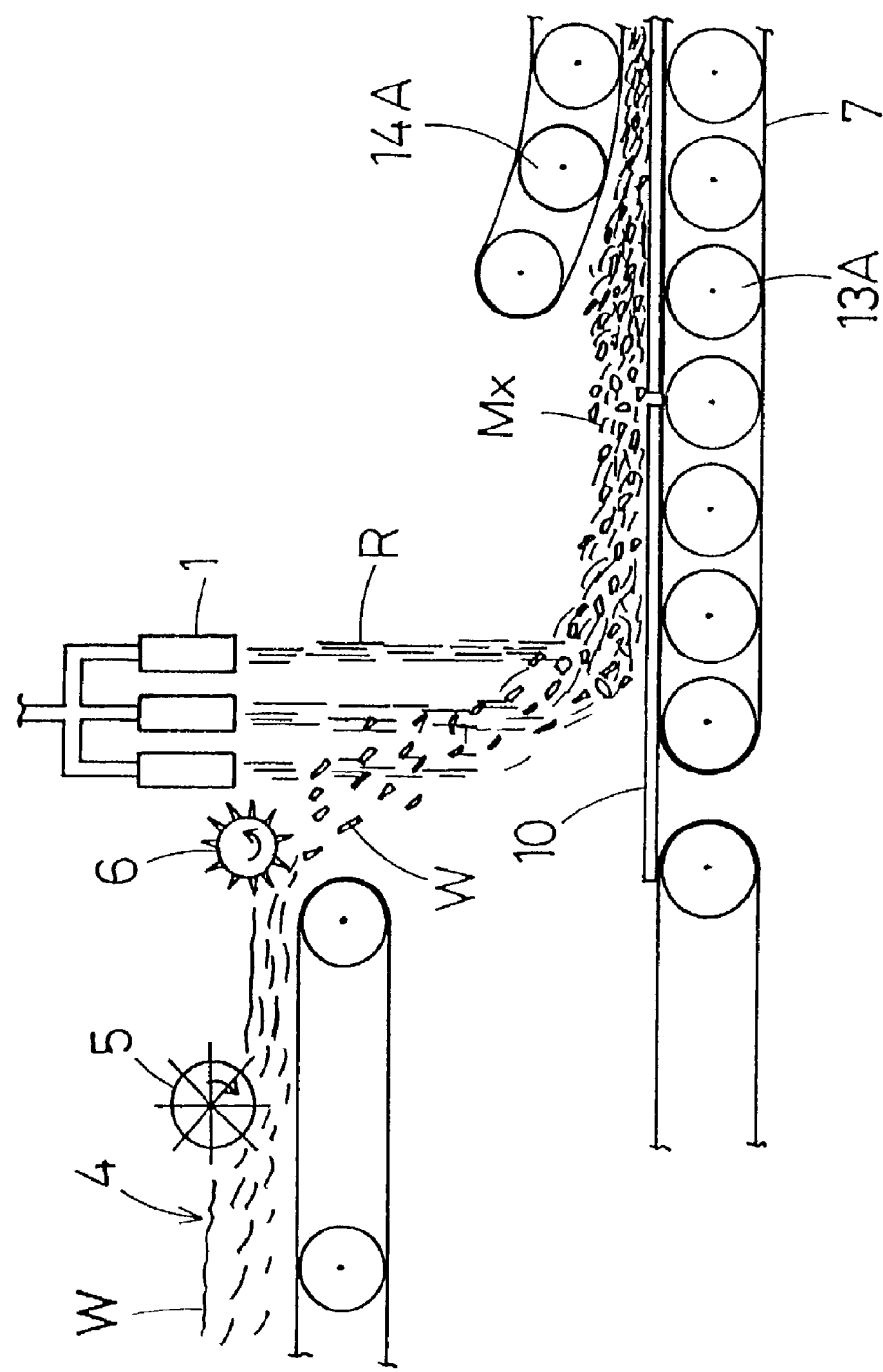
Figure 4:
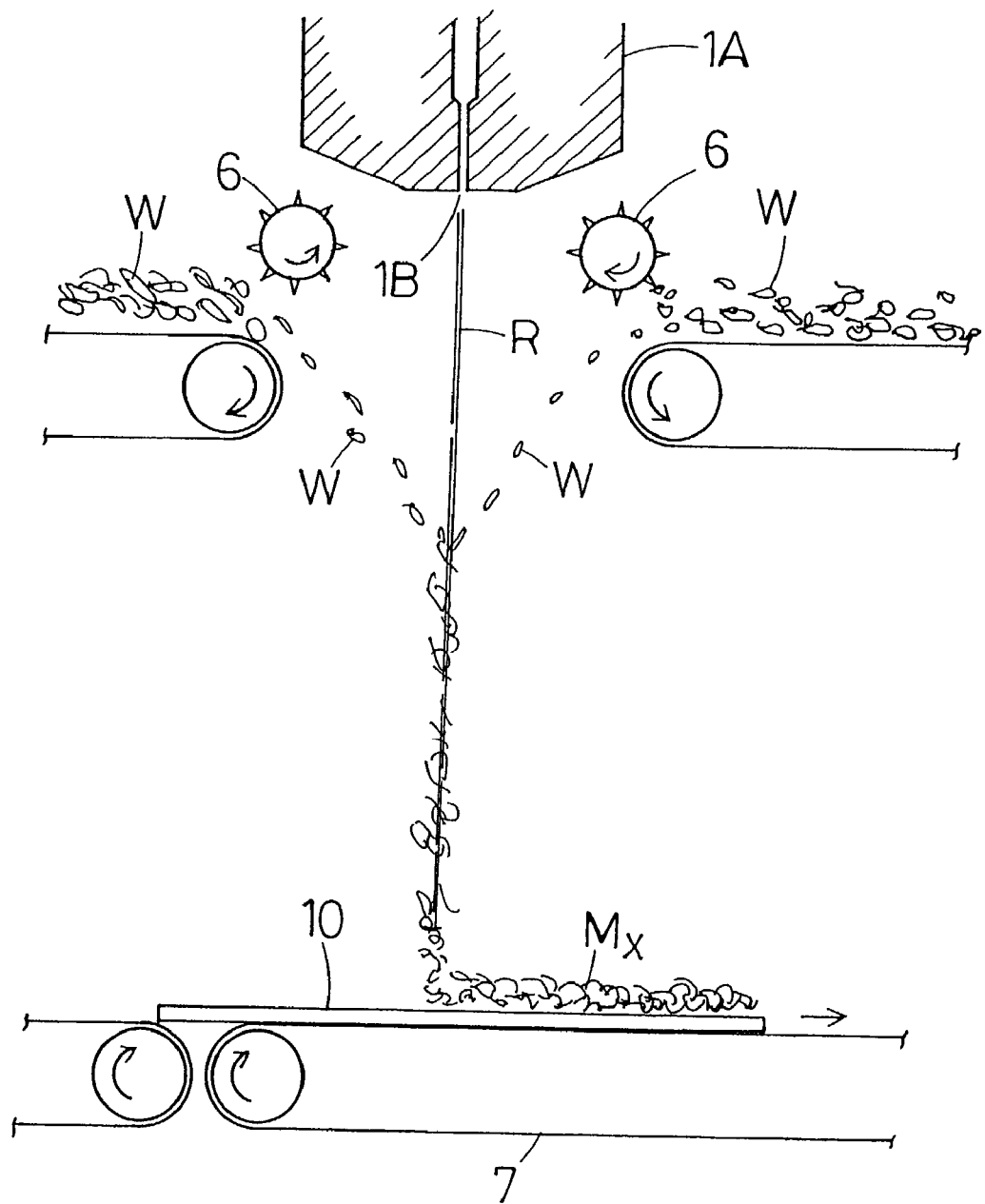

When said woody material W and said fibrous thermoplastic resin R are mixed together, a method in which said thermoplastic resin R is melted and extruded from the orifice of the die of the extruder (1) continuously or intermittently to be cooled by air as shown in FIG. 1 or if necessary, by being made to pass through the water cooler (2) as shown in FIG. 2, said thermoplastic resin R is added to said woody material W filled in the mixer (3) such as an Irich mixer, and mixed by stirring; or a method in which said thermoplastic resin R is melted and extruded in fibrous shape from the orifice of the die of the extruder (1) and said woody material W is supplied to said melted thermoplastic resin R extruded in fibrous shape from one side just before a mat M is formed as shown in FIG. 3; or a method in which said woody material W is supplied from both sides to said melted thermoplastic resin R in fibrous shape extruded from the orifice (1B) of the die (1A) as shown in FIG. 4; and the like are desirably applied.

To extrude said melted thermoplastic resin R intermittently, a method in which the orifice (1B) of the die (1A) is intermittently shut and opened with moving vanes arranged inside of said die (1A); or a method in which numbers of dies (1A) are equipped in the extruder and an electromagnetic valve is equipped in the head of each die (1A) and said electromagnetic valves are repeatedly shut and opened one by one; or a method in which air is blown into the die head to cut said fibrous thermoplastic resin by air pressure; or a method in which the screw of the extruder is intermittently moved, are applied. When said melted thermoplastic resin is extruded intermittently from the extruder, said melted thermoplastic resin R is extruded in short fiber.

In a case where said method in which said melted thermoplastic resin is extruded in fibrous shape from the extruder and said woody material is added to it, is applied, said melted thermoplastic resin R is intertwined with and adheres to said woody material W ununiformly since said fibrous thermoplastic resin R is mixed with said woody material W maintaining its melted state.

Further in a case where said woody material W and said ribbon-shaped thermoplastic resin R are mixed together, said ribbon-shaped thermoplastic resin R is desirably mixed in a melted state. In this case, said ribbon-shaped thermoplastic resin R is intertwined with and adheres to said woody material W ununiformly.

In a case where said fibrous or ribbon-shaped thermoplastic resin R intertwined with and adheres to said woody material W ununiformly as described above, lots of air is drawn into a mat when said mat is formed, and after said mat is pressed and then even a small quantity of air is extruded from said mat, the resulting molded mat M' has many voids so that a light product is obtained.

Figure 5:
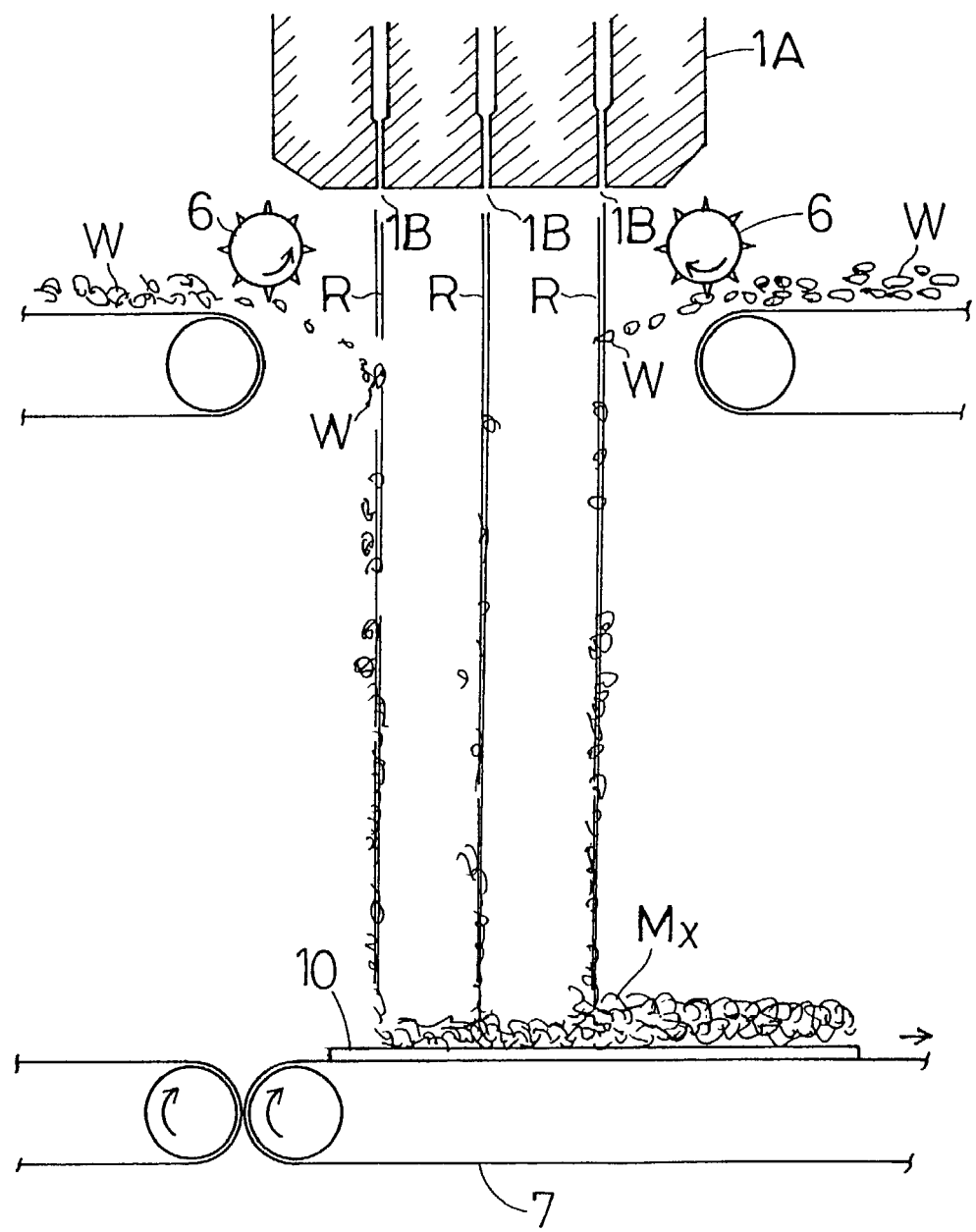
Figure 7:
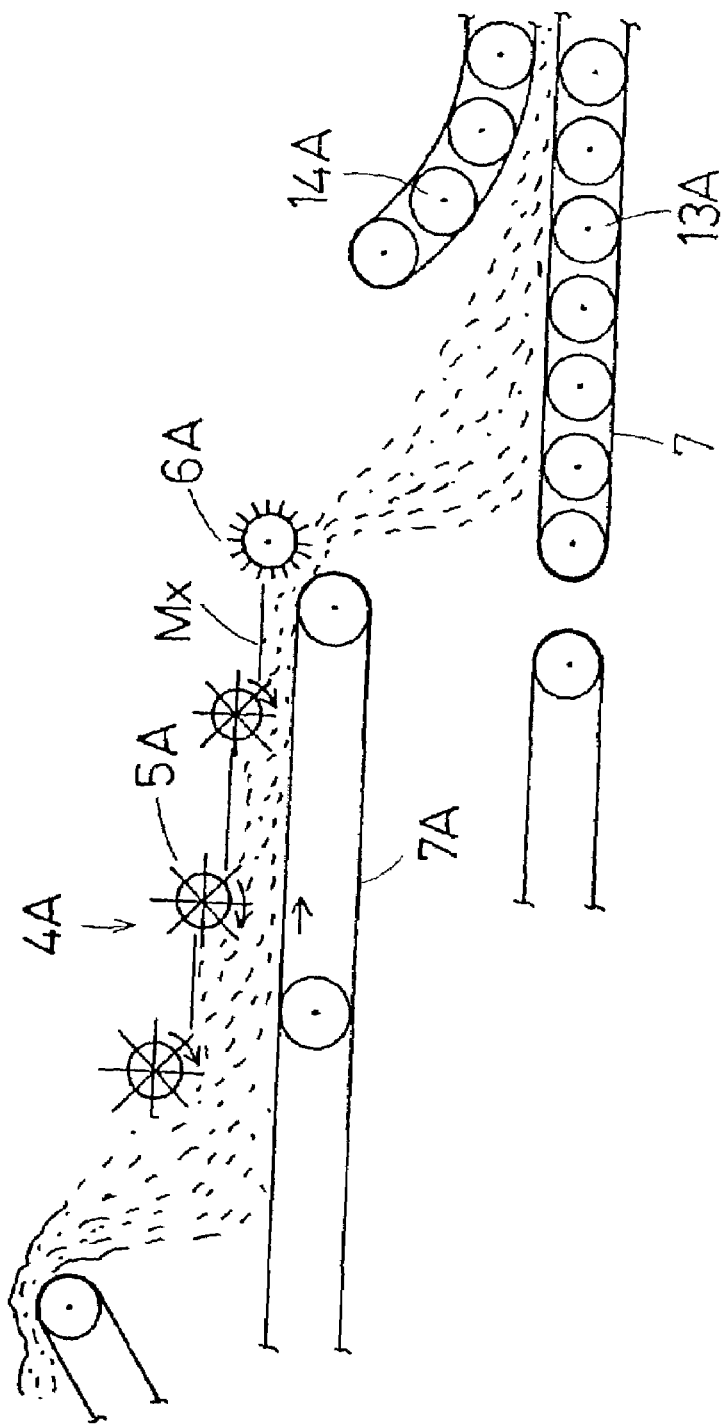

To produce a formed article having board shape, for instance said woody material W is made to pass through the former (4) to provide said woody material W with the thickness to be roughly uniform with the comb roll (5) called a raker and further said woody material W is scratched and spread with the scratching roll (6) called a spreader roll as shown FIGS. 3 and 4. The extruder (1) to sprinkle said melted thermoplastic resin R is installed in the back of, and above said scratching roll (6) or said extruder (1) is installed between a pair of scratching rolls (6.6), and said scratched and spread woody material W is sprinkled and supplied to said melted thermoplastic resin R from one side or both sides to intertwine and then said raw material mixture Mx is strewed and press formed on a compression roll press conveyer (7) or mold panels (10) being set on said conveyer (7) while said thermoplastic resin R is softened. As shown in FIG. 5, a plural number of orifices may be arranged in one row or a plural number of rows in said die (1A). Further, said raw material mixture Mx in which said woody material W and said melted thermoplastic resin are mixed together as described above is strewed on the conveyer (7A) for a while as shown in FIG. 7 and the thickness of said strewed raw material mixture Mx is smoothed to be roughly uniform with the comb roll (5A) of the former (4A) and further the resulting mat of said woody material W having a roughly uniform thickness is again loosened and crushed with the scratching roll (6A) to strew said loosened and crushed woody material W on said mold panel (10) or said compression roll press conveyer (7) connecting to a hot roll conveyer to form a mat. As described above, unevenness of the specific gravity of said raw material mixture Mx can be dissolved by forming for a while said mat through said former (4A).

In a case where the water content of said woody material W such as wood flakes is high, since the water contained in said woody material acts as a binder, for instance even if said thermoplastic resin (powdered finely) is used, said powdered thermoplastic resin R uniformly adheres to said woody material W to interfere with the separation between said woody material W and said powdered thermoplastic resin R when said raw material mixture Mx is scratched and spread.

Nevertheless in a case where said raw material mixture Mx is hot-pressed later on according to the present invention, there is a problem that water vapor is generated from said woody material W by hot-pressing so that the water content of said wood flake should be settled to be low, and in the case of powdered or chipped thermoplastic resin, said woody material W and thermoplastic resin R are separated when said mixture Mx is scratched and spread since said mixture Mx contains a small quantity of water as a binder to form a mat, in which said thermoplastic resin R is contained unevenly so that a high strength of the resulting product after molding is hard to expect.

Accordingly, said thermoplastic resin R should be fibrous and/or ribbon-shaped to be intertwined with said woody material, so that the problem that said woody material W and said thermoplastic resin R separate when said mixture Mx is scratched and spread is solved.

Figure 8:
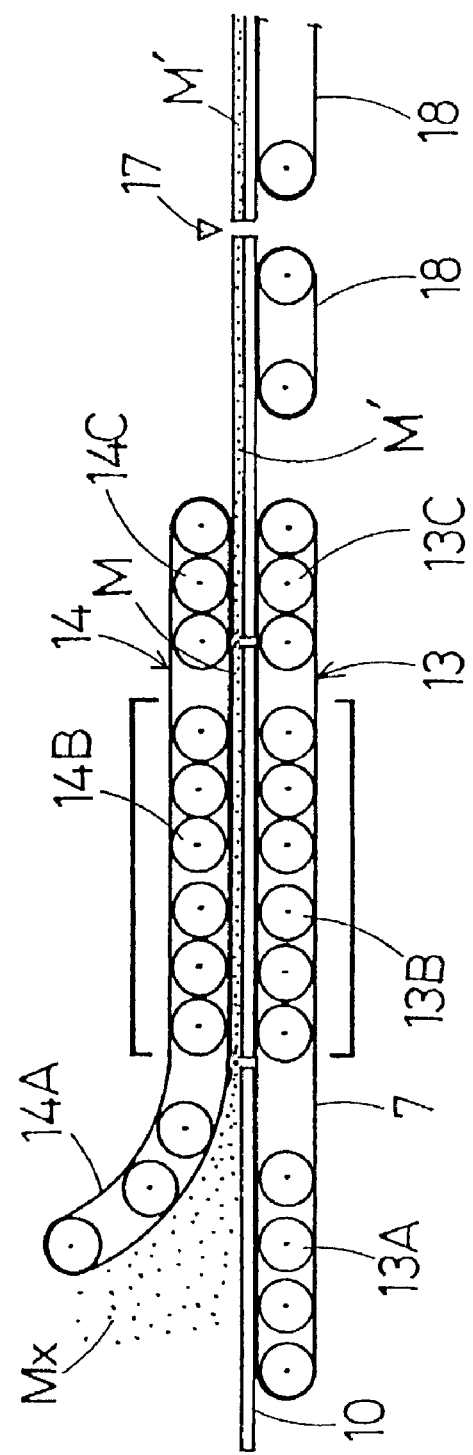

To mold said mat M, said mat M may be hot-pressed with a press machine and the resulting molded mat M' may be cooled by passing through a cold roll press, and in this case when said raw material mixture Mx is strewed on a plural number of mold panels (10) which are arranged on the moving conveyer (7) to form mats as shown in FIG. 8, the production efficiency may improved. In this case, since the resulting mats formed on said mold panels are soft, in order to prevent mat shape from crumbling and convey heat to the mat M easily during hot-pressing, the thickness of each mat is desirably compressed a little by compressing with roll presses (13A, 14A) before hot-pressing. Further in this case, said hot-pressing is desirably applied by using hot roll presses (13B, 14B) to improve the production efficiency since the continuous operations become possible.

Figure 9:
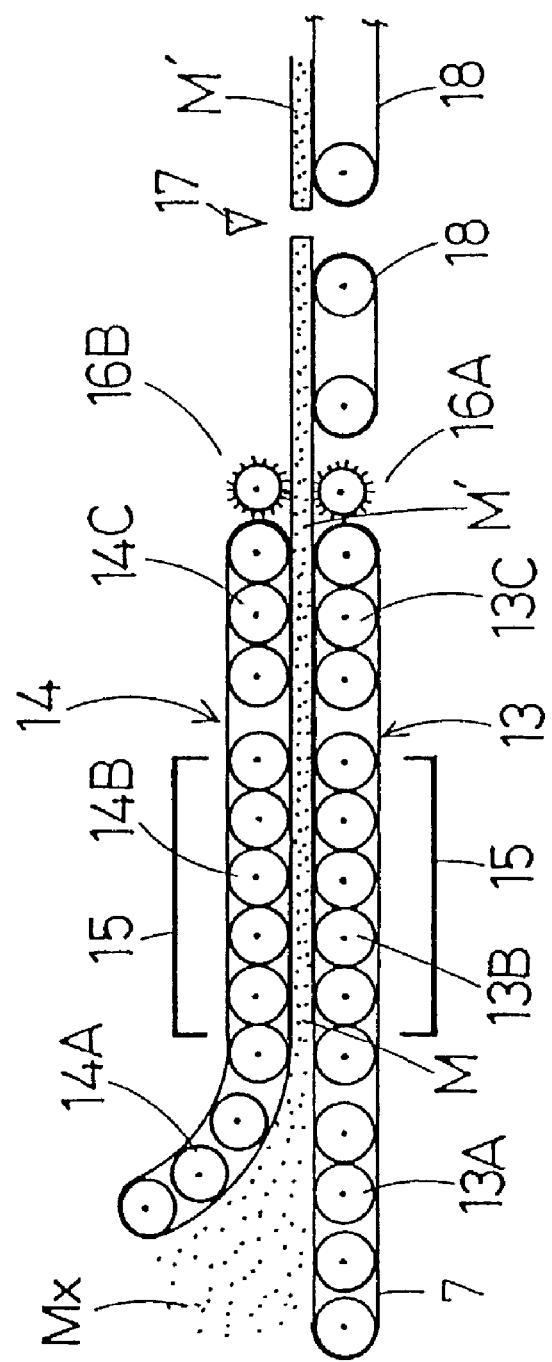

Further a method in which said raw material mixture Mx is strewed directly on said conveyer (7) to form a mat as shown in FIG. 9 also improves the production efficiency and the equipment for this method is inexpensive and economical. In this case, said molded mat M' is desirably cooled with cold rolls (13C, 14C).

Figure 10:
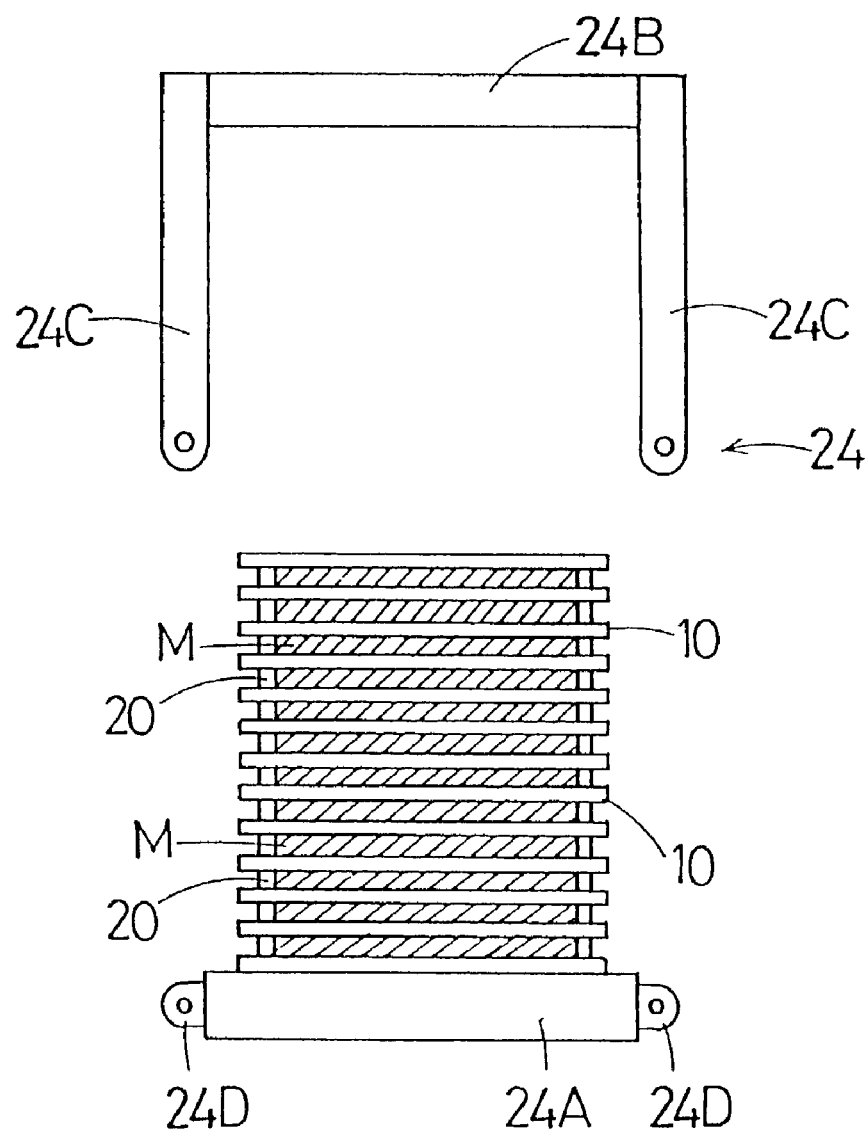
Figure 11:
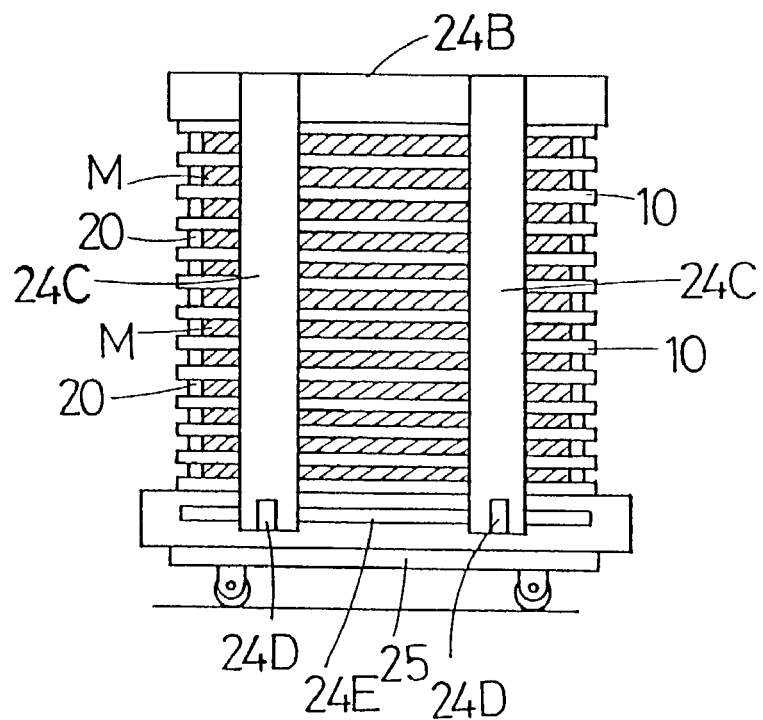

Furthermore in the method in which said mats M are formed on said mold panels (10) and hot-pressed with the pressing machine (24) as shown in FIG. 10, cooling process is desirably applied maintaining pressing condition and when a plural number of units, each unit consisting of said mat M and said mold panel, are piled in multi-stages to be pressed with said compression machine (24), the production efficiency is improved. In this case, commonly said units are piled in multi-stages on the truck (25) as shown in FIG. 11, and carrying said truck (25) into a heating chamber with said piled units further improves the production efficiency.

In a case where said mat M is formed on said mold panel (10), said mold panel (10) has commonly flat mold surface, but an uneven pattern may be formed on said mold surface or in a case where said molded mat M' is cooled by passing through said cold roll presses (13C, 14C), a board shaped woody formed article having an uneven pattern on one side or both sides can be produced, with embossing roll(s) (16A, 16B) having uneven pattern and being arranged on one side or both sides of said formed mat M' after said cold roll presses (13C, 14C) as shown in FIG. 9.

Still further a curving board shaped woody formed article can be produced by using said panel mold having an arch or wave shaped mold surface or by making said formed mat M' pass through more than three pairs of hot press rolls arranged along an arch or wave line.

In addition said mat having multi layers structure such as two or three layers structure may be formed. In the case of three layers structure, fine woody material such as a mixture of wood flakes and wood powder is used in the surface layers and rough woody material such as wood flakes are used in the core layer and thus a board shaped woody formed article which is light and has smooth surface layers having a fine structure and a core layer having a rough structure and elasticity can be provided.

To produce a woody formed article having a shape except board shape, commonly said raw material mixture is filled in a case mold whose inner surface is a mold surface having a desired shape and said mixture filled in said case mold is pressed with an upper mold having a desired shaped mold surface to be molded by heating.

Heating means such as electric heating, high-frequency heating, electromagnetic heating, vapor heating and the like are applied in any forming method.

Figure 12:
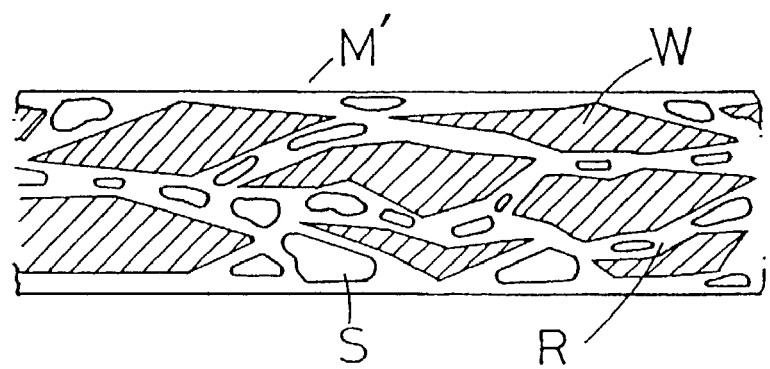

Said fibrous or ribbon-shaped thermoplastic resin R holds a large quantity of air and most of this remains in the latter after it has been hot-pressed as shown in FIG. 12, and in a case where said fibrous or ribbon shaped thermoplastic resin R is melted, resulting the formation of many voids S within the article, the resultant product is of a light weight. Further, said formed article is strong, durable, and holds nails firmly, making it an ideal material for roof sheathings, and the like.

Additionally, a preferable method to produce said woody formed article of the present invention is a melt-blow method. In said method, hot wind and/or cold wind is/are blown obliquely and downwardly against said thermoplastic resin R extruded from the orifice of the die from both sides to cut said thermoplastic resin R into short fiber or to stretch to thin into thin fiber. Said shortened or thinned fibrous thermoplastic resin R as described above does not cause the phase separation without influence of the mutual compatibility of each thermoplastic resin R in a case where said thermoplastic resin R is a mixture containing various waste thermoplastic articles without separation.

Accordingly in this method, waste thermoplastic articles are effectively recycled without separation.

To produce said woody formed article of the present invention by above described method, first, said woody material W and said thermoplastic resin R in a melted state are mixed together. To mix said woody material W and said fibrous thermoplastic resin R together, said thermoplastic resin R is melted and extruded vertically from the orifice of the extruder's die under a high pressure, and said woody material W is supplied to said continuous or intermittent fibrous thermoplastic resin R in a melted state from both sides or one side. Commonly mixing weight ratio of said woody material to said fibrous thermoplastic resin is settled to be in the range of between 20:80 and 90:10.

In the above described process, said fibrous thermoplastic resin R in a melted state is stretched and thinned by hot wind pressure or cold wind pressure and is intertwined with said woody material W by accompanying flow (minus pressure range) generated by said hot wind and/or said cold wind so that the resulting mixture becomes uniform. In a case where cold wind is used, high wind pressure can be exerted to promote the stretching of said fibrous thermoplastic resin R in a melted state.

Figure 15:
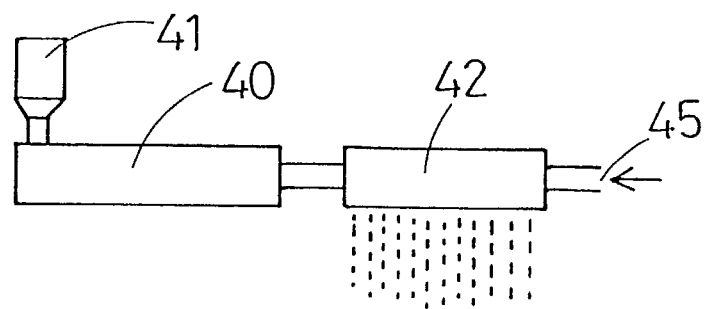
Figure 16:
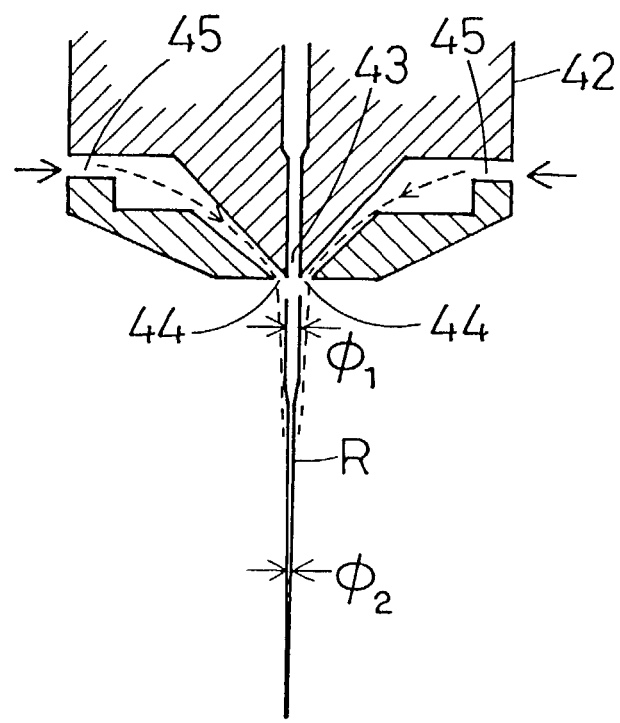

Adding to this, said fibrous thermoplastic resin R in a melted state means fibrous thermoplastic resin R which is in a melted state so as to be stretched and thinned by hot wind pressure and/or cold wind pressure and it is not always necessary that said thermoplastic resin R is wholly melted, and solid thermoplastic resin R may be partially contained in said thermoplastic resin R in a melted state. To put it concretely, said chip or pellet shaped thermoplastic resin is supplied into the extruder (40) through the hopper (41) arranged in the root part of said extruder (40), and said thermoplastic resin R is heated and melted in said extruder (40) and then extruded into the die (42) as shown in FIG. 15. After that said thermoplastic resin is extruded from an orifice (43) of said die (42) in fibrous shape as shown in FIG. 16. A pair of jets (44) are arranged in both sides of said orifice (43) of said die (42) and hot wind supplied from a hot wind supplying path (45) to said jets (44) is blown obliquely and downwardly to said extruded thermoplastic resin R to stretch and thin.

Figure 17:
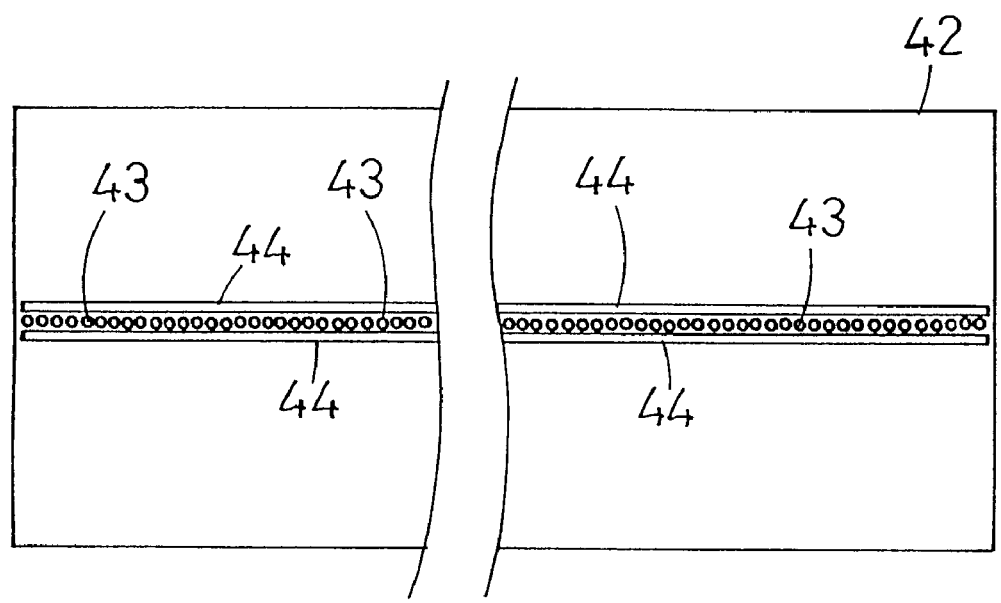
Figure 18:
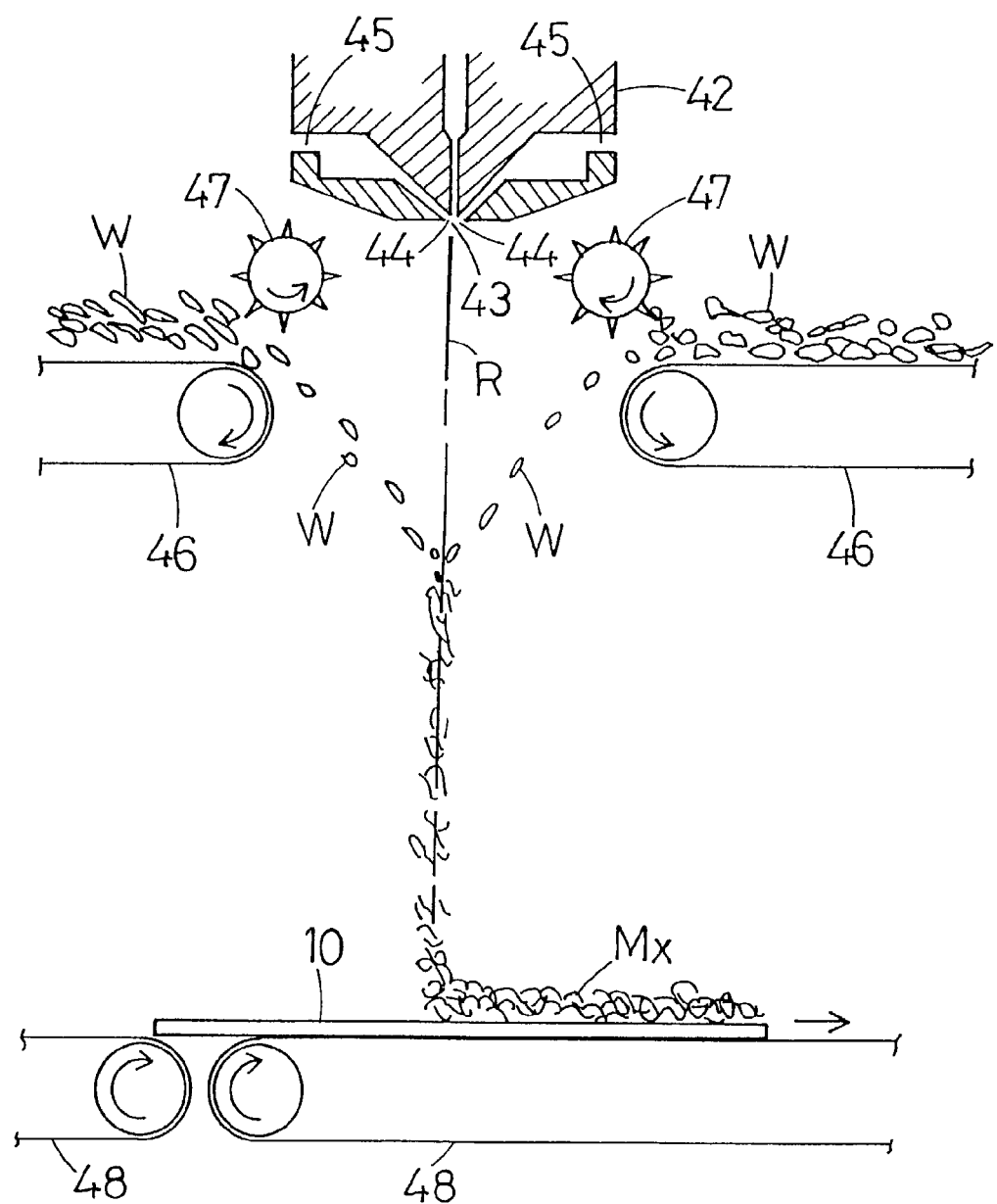

A plural number of said orifices (42) are desirably arranged in a line in said die (42) as shown in FIG. 17 and in this case said hot wind jets (44) are slits arranged along both sides of said orifices line (43).

The caliber $\phi_1$ of said orifice (43) of said die (42) is desirably in the range from 0.2 to 2.0 mm and in the case of the orifice having a caliber $\phi_1$ below 0.2 mm, said orifice is apt to be clogged with said melted thermoplastic resin R, especially impurities contained in melted waste thermoplastic resin, and in the case of the orifice having a caliber $\phi_1$ over 2.0, said extruded thermoplastic resin R is not thinned well when stretched and uniform mixing said thermoplastic resin with said woody material becomes difficult.

As shown in FIG. 16, in the case of orifice having a caliber $\phi_1$ in the range from 0.2 to 2.0, the diameter $\phi_2$ of said fibrous thermoplastic resin R extruded from said orifice (43) after stretching and thinning becomes in the range from 0.05 to 0.8 mm and in this range, said orifice (43) is not clogged and said extruded fibrous thermoplastic resin R can be mixed uniformly with said woody material W.

To produce said woody formed article continuously, a pair of woody material supplying conveyers (46, 46) are arranged just under both sides of a set of said orifices (43) and said woody material W on each supplying conveyer (46, 46) is strewed with strewing rolls (47, 47) arranged at the end part of each supplying conveyer (46, 46) and said strewed woody material is mixed with said fibrous thermoplastic resin R extruded from said set of said orifices (43) downwardly and being stretched and thinned by hot wind pressure.

In this case, said extruded thermoplastic resin R keeps its melted state by being heated by hot wind and said woody material W is sucked toward said thermoplastic resin R by the accompanying flow (minus pressure range) formed in both sides of said thermoplastic resin R by said hot wind pressure and as a result, said woody material W, especially flake shaped woody material, wood flakes, spin around said extruded thermoplastic resin R and said wood flakes contact with said thermoplastic resin R being stretched and thinned, to be intertwined with said thermoplastic resin R in a melted state, so that said thermoplastic resin R in a melted state and said woody material W are mixed uniformly and said stretching and thinning of said extruded thermoplastic resin R are accelerated by the weight of said wood flakes.

As described above, after said melted thermoplastic resin R and said woody material W are mixed uniformly and then the resulting mixture Mx accumulates on mold panels (10) arranged on a conveyer (48) and said mixture accumulating on said mold panels (10) is sent to a roll press or mold press (not shown in the Figures) to be molded into a board shape by pressing.

Figure 19:
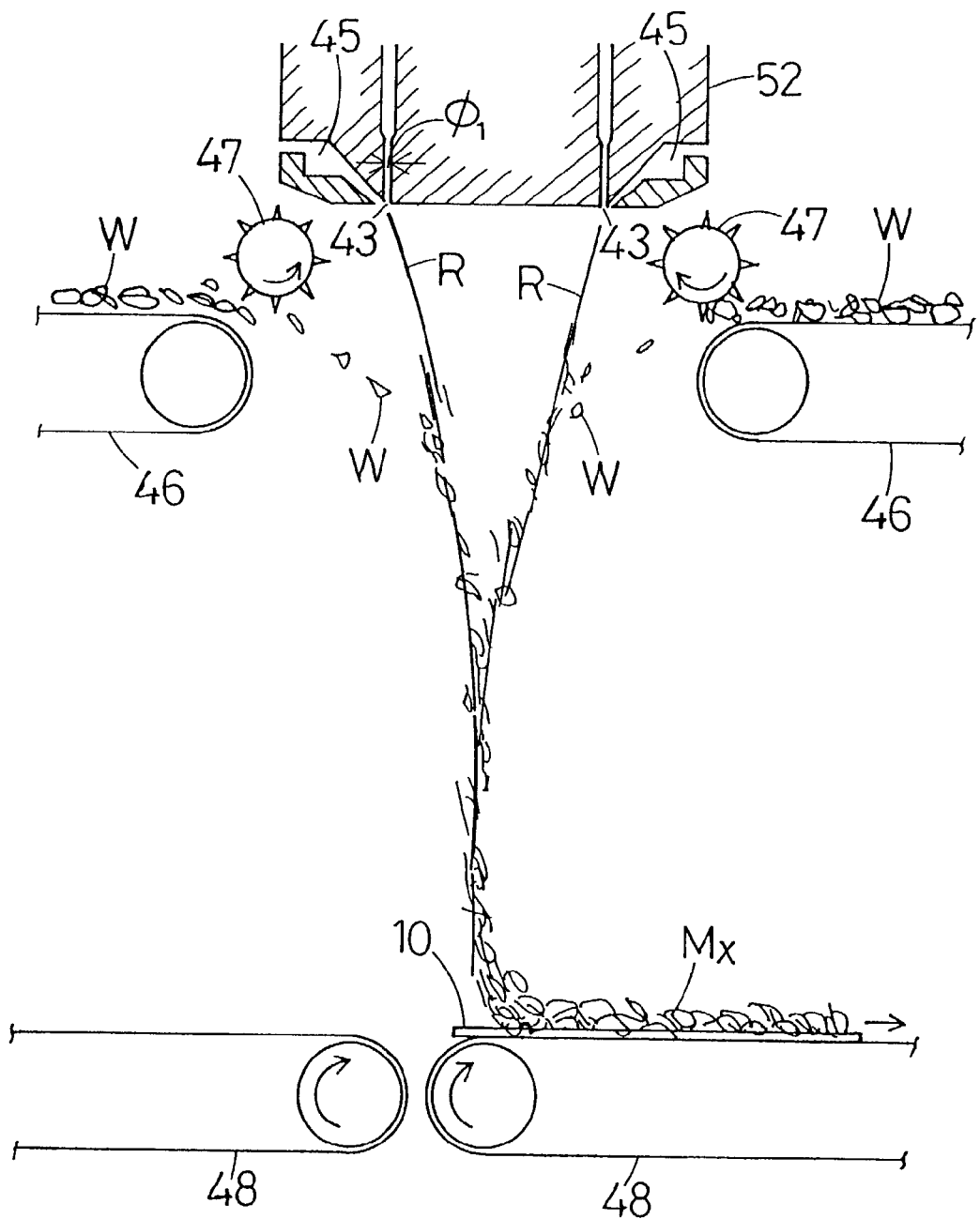

A plural number of orifices (43) may be arranged in plural rows such as two rows in said die (52) as shown FIG. 19. In this case said thermoplastic resins R extruded from orifices (43) sets in both rows are oriented so as to approach mutually being stretched and thinned by hot wind pressure and said woody material W is supplied to said thermoplastic rein R strings before said thermoplastic resin R strings extruded from orifices (43) sets in both rows join together. After that said two sets of said thermoplastic resin R strings are intertwined with said woody material W and then said two sets of said thermoplastic resin R strings join together and said melted thermoplastic resin R and said woody material W are mixed uniformly, and the resulting mixture Mx is accumulated on mold panels (10) on said conveyer (48) to form mats. In a case were orifices (43) are arranged in two rows supplying quantity of said melted thermoplastic resin R (resin quantity extruded from orifices) becomes twice comparing with that in the case of one row so that supplying quantity of said woody material W is settled to be twice corresponding to supplying quantity of said melted thermoplastic resin R and conveying speed of mold panels (10) is also settled to be twice. Accordingly, the output of said woody formed articles become twice.

Figure 20:
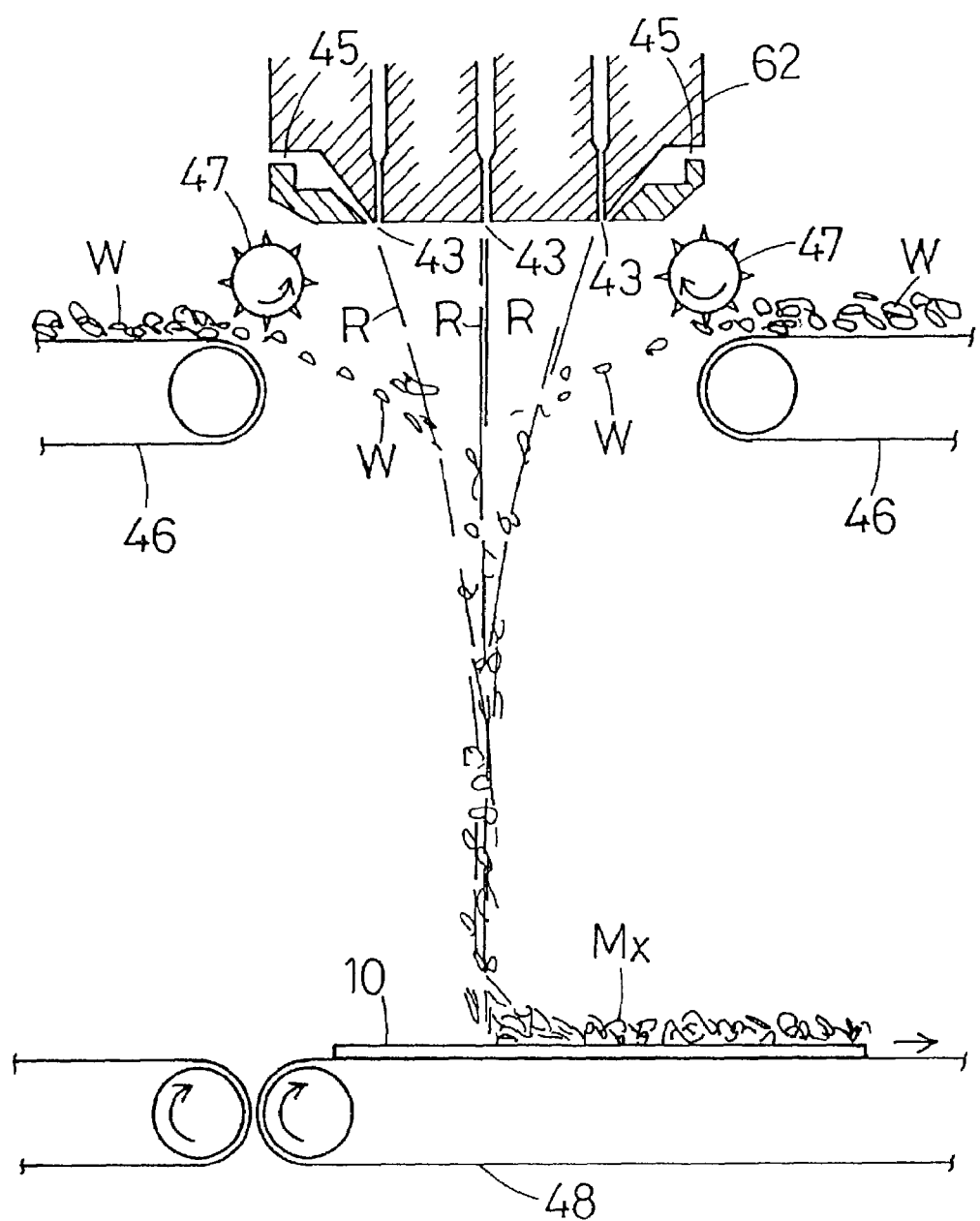

FIG. 20 shows a case in which orifices (43) are arranged in three rows in said die (62). In this case the thermoplastic resin R strings extruded from orifices (43) in the middle row are not much stretched and thinned by hot wind from said die, while the thermoplastic resin R strings extruded from orifices (43) in both sides are stretched and thinned and said woody material W is supplied to the stretched and thinned thermoplastic resin R strings. Said stretched and thinned thermoplastic resin R strings, being intertwined with said woody material W, join said thermoplastic resin R strings which has been extruded from orifices (43) in the middle row and not much stretched and thinned, from both sides. Accordingly, the resulting mixture Mx of thermoplastic resin R and said woody material W is accumulated on each mold panel (10) on said conveyer (48) to form a mat having two layer structure.

In this case, supplying quantity resin (quantity extruded from orifices) of said melted thermoplastic resin R becomes three times so that supplying quantity of said woody material W is settled to be three times and conveying speed of mold panels (10) is also settled to be three times. Accordingly, the output of said woody formed articles become three time.

Figure 21:
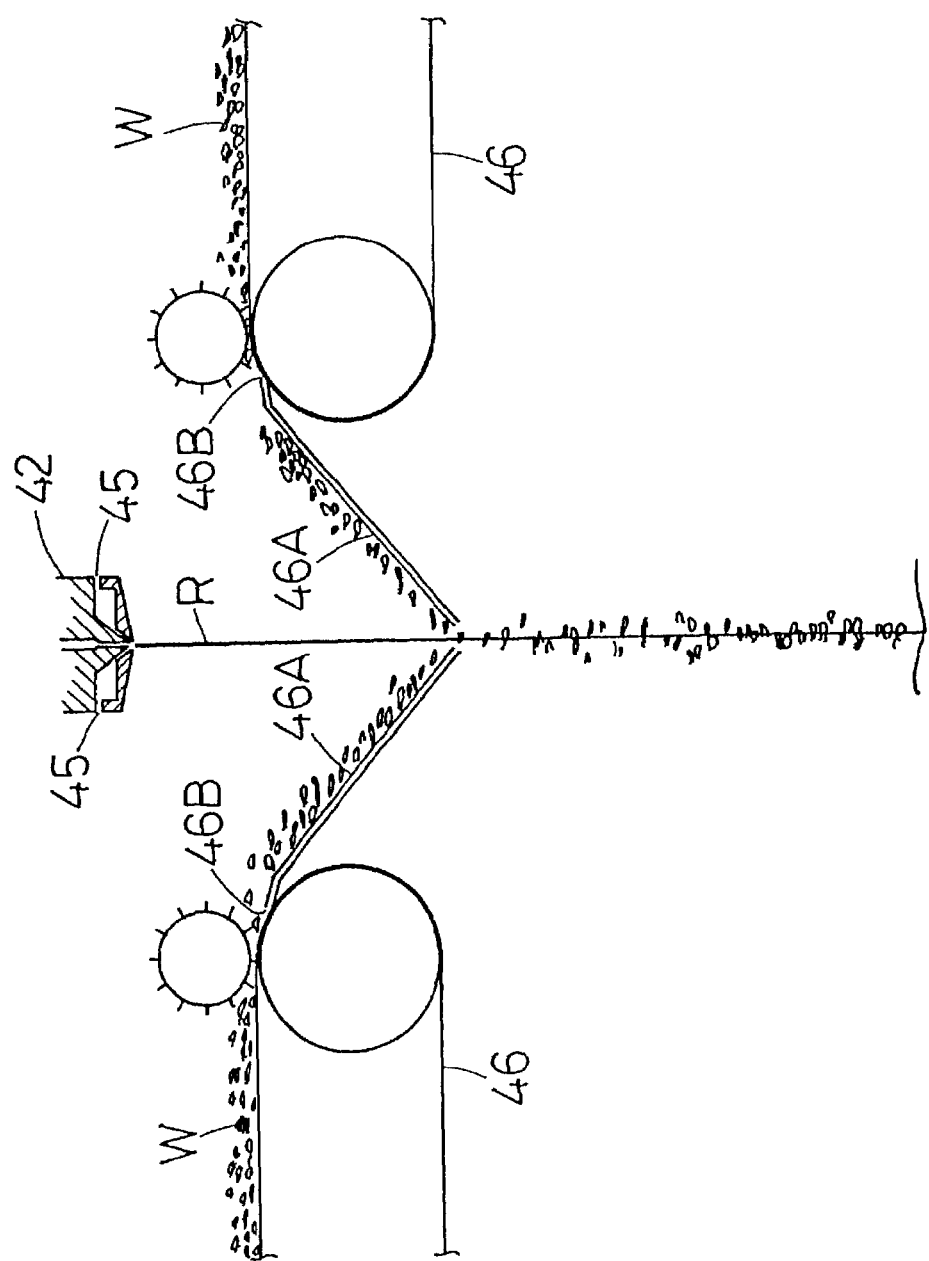

Said thermoplastic resin R extruded from said orifice can be stretched and thinned by cold wind from said die instead of hot wind as shown in FIG. 21. In FIG. 21, a pair of slanting racks (46A, 46A) are connected with the front-ends of a pair of woody material W supplying conveyers (46, 46) on both sides respectively and a pair of cold wind introducing paths (46B, 46B) are arranged under said slanting racks (46A, 46A) respectively to blow cold wind to said extruded thermoplastic resin R from said cold wind introducing paths (46B, 46B). In this case, said extruded thermoplastic resin R to which cold wind contacts is not much stretched since said extruded thermoplastic resin R is cooled by said cold wind, but said orifice of said die is heated and said extruded thermoplastic resin R is still in its melted state so that the stretching and thinning of said extruded thermoplastic resin are accelerated between said orifice and said cold wind. Further in the case of cold wind, heat energy to prepare hot wind is not necessary so that a big quantity of wind can be provided and the process can be done economically and effectively. Furthermore, said stretching and thinning of said thermoplastic resin R can be controlled by blowing only cold wind from said die, stopping hot wind, since much bigger quantity of cold wind can be provided from said die comparing with hot wind and the control of said stretching and thinning can be easily performed.

Still further, in a case where a panel type jet blowing cold wind is employed, said panel type jet can be used as a guide to supply said woody material W, so that said extruded thermoplastic resin R can be intertwined more effectively with said woody material W. In addition, a pair of hot wind supplying paths (45A, 45A) may be arranged between hot wind from said die (42) and cold wind from underside of said slanting racks (46A, 46A) and hot wind may be blown to said thermoplastic resin R from said hot wind supplying paths (45A, 45A) to stretch and fine said thermoplastic resin R. In this case, since said extruded thermoplastic resin is kept hot just before cold wind contacts with it, it can be stretched and thinned more thinly.

Figure 23:
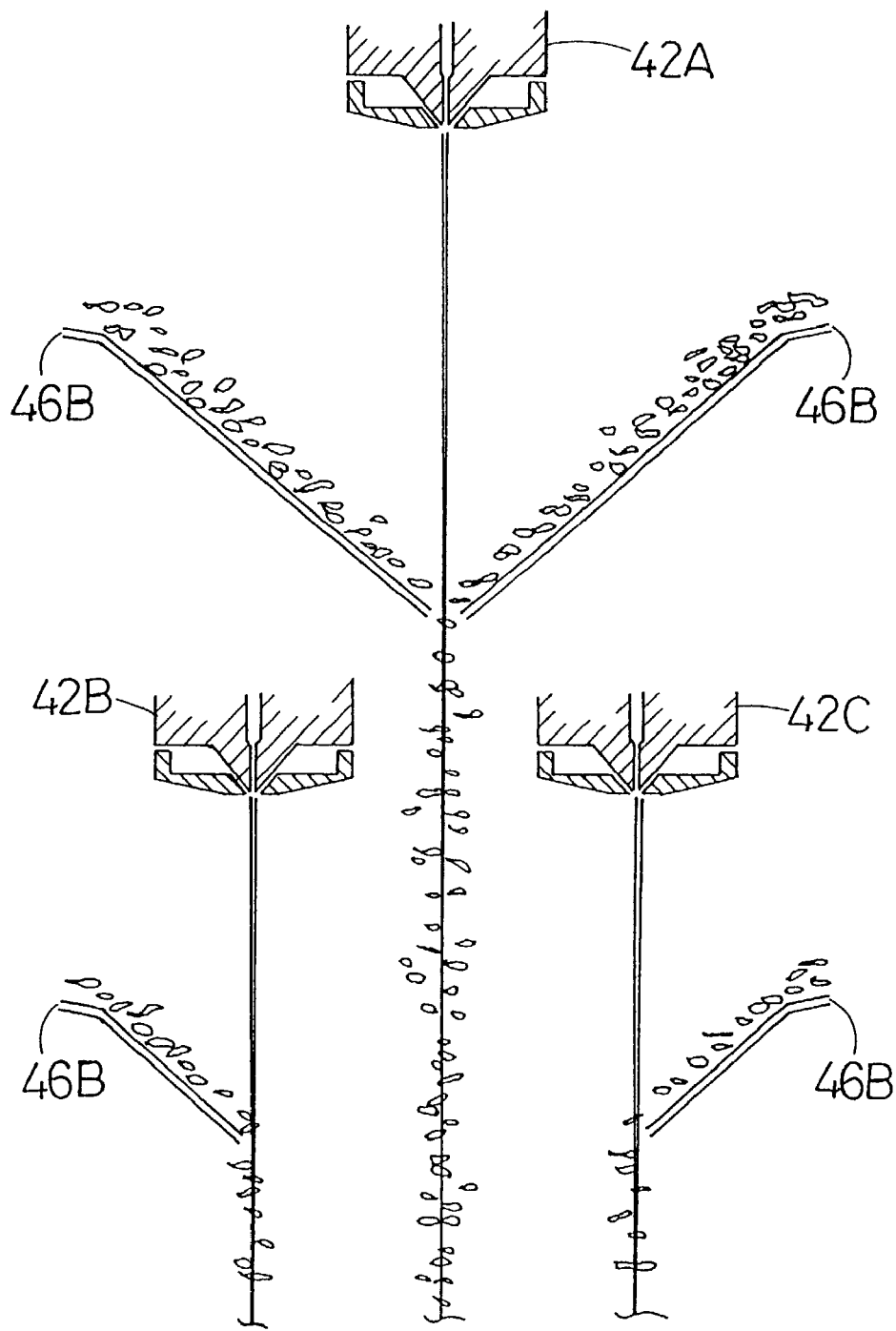

Additionally in a case where three dies (42A, 42B, 42C) are arranged stepwise and said die (42) arranged in middle and higher position and two dies (42B, 42C) arranged in both sides and lower positions and a pair of cold wind introducing paths (46B, 46B) are arranged in the under and outer positions of said lower dies (42B, 42C) as shown in FIG. 23, accumulating quantity of said mixture of said thermoplastic resin R and said woody material W can be increased and a mat having three layers can be formed.

In said producing process of said woody formed article, to keep a good dispersing state of said thermoplastic resin R, said woody material W is desirably supplied by heating. In a case where said woody material W is heated, said melted thermoplastic resin R can be intertwined with and adhere to said woody material W strongly to prevent separation between said woody material W and said thermoplastic resin R.

Figure 24:
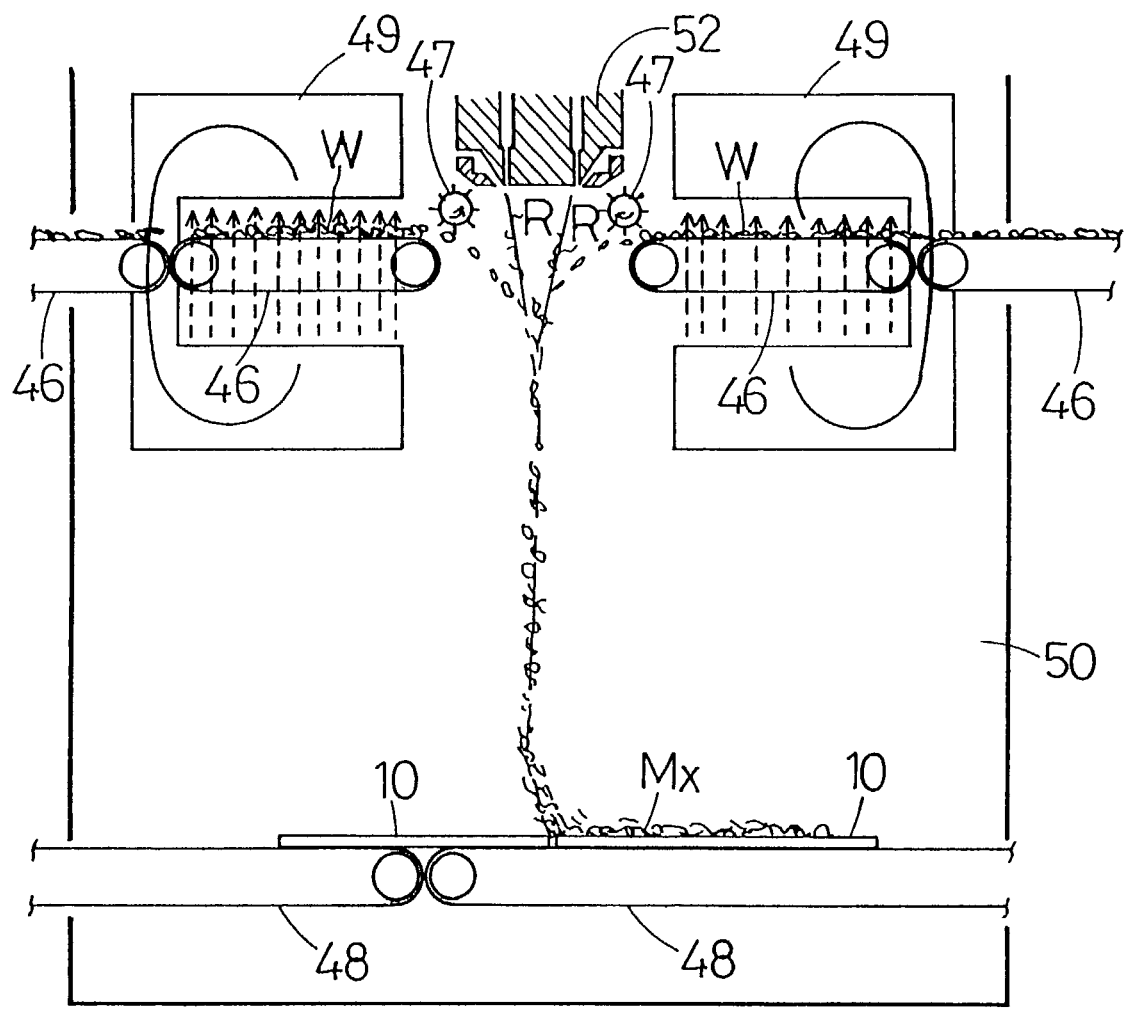

To heat said woody material W as described above, net conveyers are used as supplying conveyers (46, 46) and said woody material W on said supplying conveyers (46, 46) is heated by hot wind being circulated and heated, during circulation (as indicated by the arrows) with hot air circulation apparatuses (49, 49) as shown FIG. 24. In this system, said woody material W is effectively heated and dried. Further said system is desirably put in a room (50) to keep warm.

As described above, in a case where said mixture Mx of said melted thermoplastic resin R and said woody material W accumulating on each mold panel (10) in mat shape is press-molded just after said mixture Mx accumulates on each mold panel, the heat still remains in said mixture Mx so that it is not necessary to heat said mixture Mx again, improving productivity and heat efficiency. In a case where said mixture Mx is press-molded after time has passed since said mixture Mx has accumulated on the mold panel, said mixture Mx is press-molded by heating but since said thermoplastic resin has been melted once, the heat efficiency is much higher than that of the mixture which is prepared by cold blend.

Figure 25:
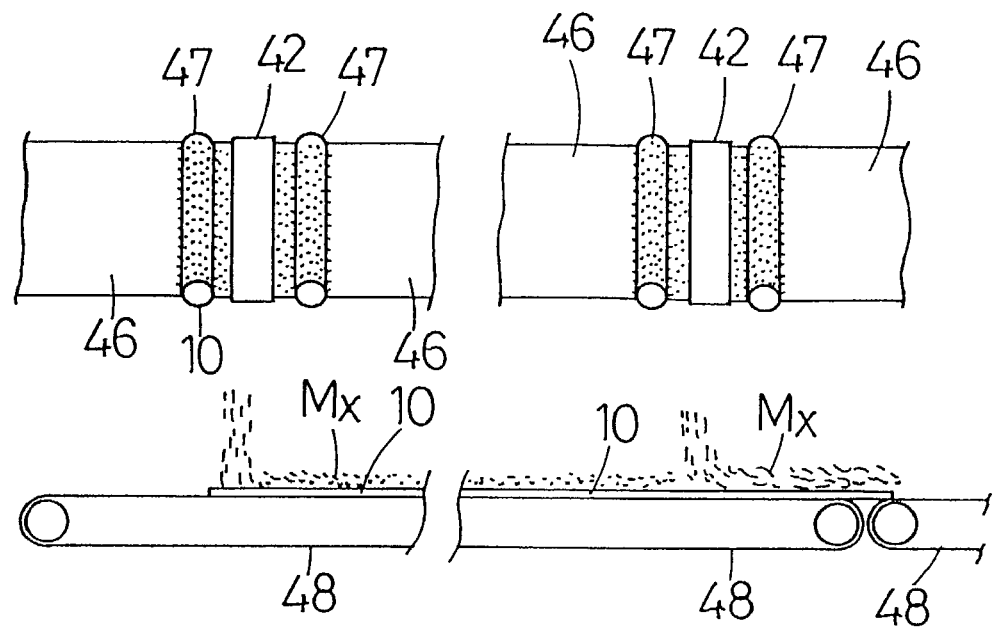

Further in a case where a plural number of said woody material supplying conveyers (46) and a plural number of dies (42) are arranged in multi-stages as shown in FIG. 25, productivity can be much improved.

Figure 26:
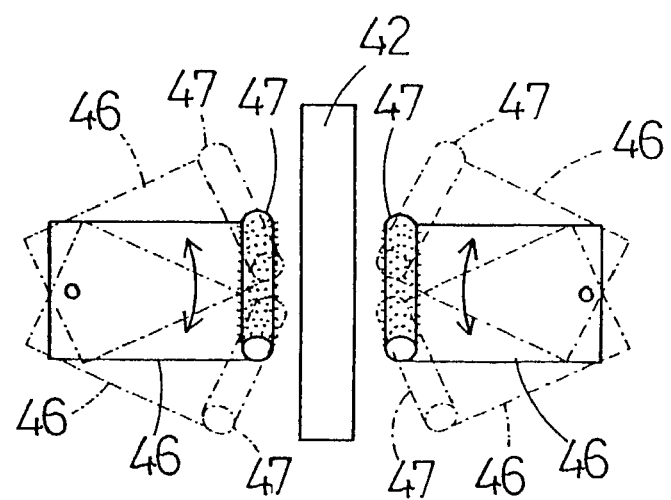
Figure 27:
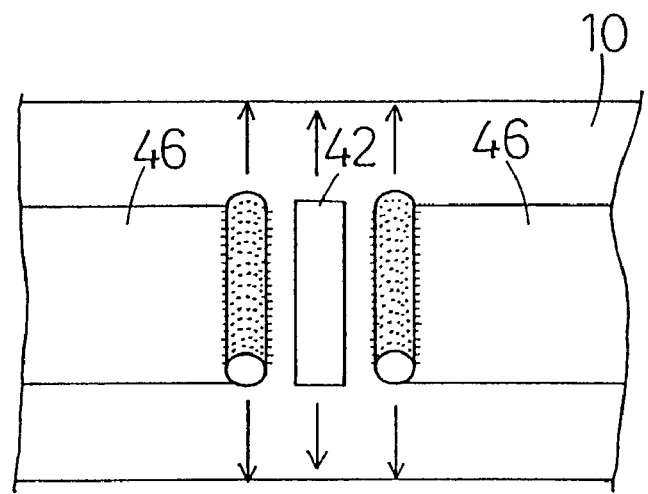

Furthermore in a case where said woody material supplying conveyers (46, 46) are set up so as to oscillate right and left as shown in FIG. 26 or said woody material supplying conveyers (46, 46) and said die (42) are set up so as to move reciprocally right and left along width direction an uniform mat M can be formed on each mold panel (10) on a conveyer (48) as shown in FIG. 27. A plural number of said woody material supplying conveyers which can oscillate or a plural number of said woody material supplying conveyers which can move reciprocally along width direction and a plural number of dies may be arranged in multi-stages as shown in FIG. 25.

Figure 28:
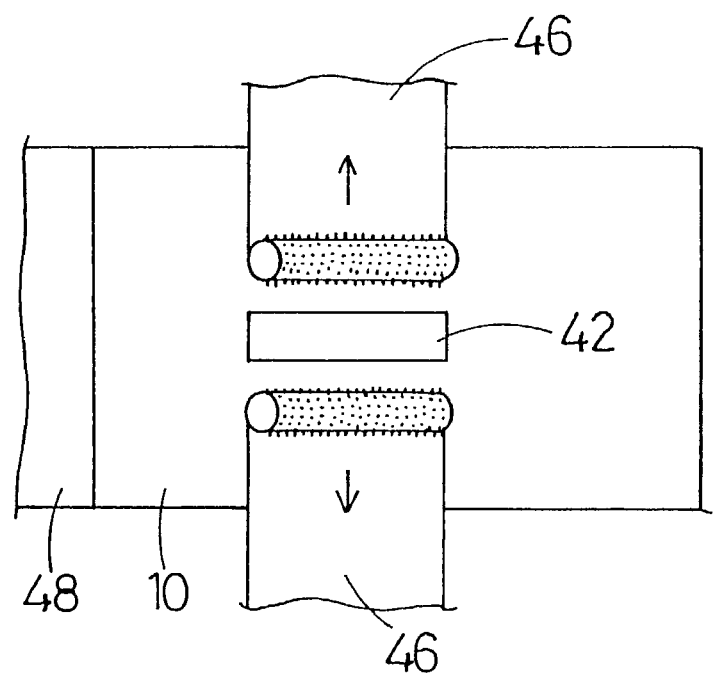

Still further said woody material supplying conveyers (46, 46) and said conveyer (48) may be arranged so as to cross at right angles and said die (42) may arranged laterally, and said supplying conveyers (46, 46) and said die (42) may be set up so as to move reciprocally along width direction as shown in FIG. 28. In this system, a uniform mat M also can be formed on each mold panel (10) on said conveyer (48).

In addition, a plural number of said supplying conveyers and dies may be arranged in multi-stages along lateral line.

As described above, in a case where said mat M accumulating on each mold panel (10) still maintains its heated state just after said mat is formed on each mold panel (10), said mat is molded with a cold compression machine, cold press machine, cold milling roll machine and the like and in a case where said mat M is cooled after time has passed since said mat M has been formed on each mold panel (10), said mat is molded with a hot press machine, hot roll press machine or the like and the resulting formed mat M' is cooled and fixed with a cold press machine, cold roll press machine, or the like.

Additionally, the structures shown in FIG. 17, FIG. 19, and FIGS. 24 to 28 are of course applied to systems shown in FIG. 2 to FIG. 4 in which hot wind and/or cold wind is(are) not blown from both sides of said orifice.

EXAMPLE 1

Figure 6:
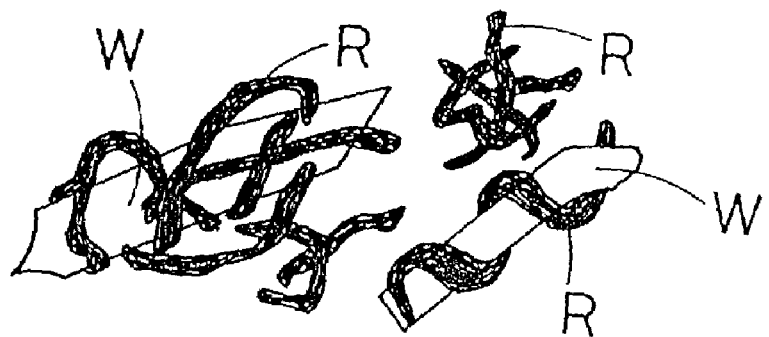

Waste polypropylene sheets were heated and melted and extruded in fibrous shape from said extruder (1) shown in FIGS. 1 and 2 and said melted fibrous polypropylene was added to wood flakes W (size 4 to 8 mm×20 to 25 mm×0.5 to 1 mm) in a mixer (3) which was heated and kept warm, and mixed for 1 minute by stirring. Mixing ratio of said resin to said wood flakes was said fibrous thermoplastic resin R 50% by weight, said wood flakes W 50% by weight. In said raw material mixture A, since said fibrous polypropylene (thermoplastic resin R) was added and mixed in said wood flakes W, maintaining its heated and softened state, said fibrous polypropylene (thermoplastic resin R) was melted being intertwined with said wood flakes ununiformly as shown in FIG. 6.

Further said fibrous thermoplastic resin R was intertwined with each other between said wood flakes.

Said raw material mixture Mx was made to pass through the former (4) and its thickness was made even with the comb roll (5) and said mixture Mx was again scratched and spread with the scratching roll (6) as shown in FIG. 3 to be supplied directly on the conveyer part (7) of the front compression roll press part (13A, 14A) of a pair of roll presses (13, 14) arranged up and down shown in FIG. 9, and the thickness of said mixture Mx was compressed to arrange the shape with said compressing roll press part (13A, 14A) and then the resulting mat M of said mixture Mx was press-molded by heating at a temperature in the range of between 180 and 220° C. (press pressure 6 MPa) with the roll press part (13B, 14B) of said roll presses (13, 14) heated by hot wind in the heating chamber (15). The resulting formed mat M' was cooled with the rear cold roll press part (13C, 14C) of said roll presses (13, 14) arranging the shape of said mat (gap between rolls 12.0 mm, pressing pressure 0.5 MPa). After cooling, both surfaces of said formed mat M' were embossed with the pair of embossing rolls (16A, 16B) arranged up and down to transfer said formed and embossed mat M' to a conveyer (18) and said mat M' was cut with the cutter (17) in a designated size to prepare a board shaped test piece 1.

In said board shaped test piece 1, said wood flakes W adhere mutually by said fibrous, melted thermoplastic resin R as shown in FIG. 12 and said fibrous thermoplastic resin R is intertwined with and adheres to said wood flakes W ununiformly and said fibrous thermoplastic resin R is intertwined mutually between said wood flakes so that the surface of each wood flake is covered and sealed with said thermoplastic resin R but a lot of voids S remain in the resulting board after press-molding and a light woody formed article can be provided.

EXAMPLE 2

Waste polyethylene sheets were cut into ribbon-shape with a shredder.

A raw material mixture Mx of 50% by weight of said ribbon-shape polyethylene (thermoplastic resin R), 25% by weight of wood flake W, and 25% by weight of wood powder (pass through a mesh having opening whose diameter is 1 mm) was prepared by stirring and mixing in Irich mixer and said mixture Mx was strewed on mold panels (10) moving on a roll conveyer (7) by using the former (4) in the same manner as in EXAMPLE 1 as shown in FIG. 8 to form a mat M on each mold panel (10). The thickness of said mat M is compressed a little with the compressing roll press part (13A, 14A) to arrange its shape and then press molded with hot roll presses (13A, 14A) by heating at a temperature in the range from 120 to 170° C. (6 MPa), Said formed mat M' was cooled with the cold roll press part (13C, 14C) (5 MPa, gap between rolls 12.0 mm) to produce a board shaped test piece 2.

EXAMPLE 3

Waste non-woven fabric made of polyester fiber was roughly crushed with an uniaxial shredder and further splitted with a double disk refiner to produce reclaimed fiber. Using said reclaimed fiber, a mixture B having a composition as described below was prepared.

| | |
|---|---|
| Reclaimed fiber | 50% by weight |
| Wood flakes (EXAMPLE1) | 25% by weight |
| Wood powder (EXAMPLE2) | 25% by weight |

Said mixture B was strewed on each mold panel (10) to form a mat M, as shown in FIG. 8 and said mat M was introduced into the hot roll presses (13B, 14B) heated at a temperature in the range of between 250 and 280° C. with said mold panel (10), and compressed to reduce gradually the thickness of said mat M. In this case, maximum pressing pressure is 6 MPa and gap of rolls is 12.0 mm. As described above a board shaped test piece 3 was prepared.

EXAMPLE 4

Waste article made of polypropylene was crushed and melted and extruded from the extruder (1) shown in FIG. 2 in fiber shape and while said melted polypropylene maintains its heated state, said wood flakes W in the same manner as in EXAMPLE 1 was scratched and spread with the scratching roll (6) of the former (4) and strewed on the roll conveyer (7) being intertwined with said fibrous polypropylene. The resulting mixture was press-molded by heating at a temperature in the range of between 180 and 220° C., and pressing pressure 6 MPa with hot roll presses (13B, 14B) and then the resulting formed mat M' was cooled with the cold roll presses (13C, 14C) (pressing pressure 0.5 MPa, gap of rolls 12.0 mm) to prepare a board shaped test piece 4.

EXAMPLE 5

Said mixture A prepared in EXAMPLE 1 was strewed on the mold panel (10) to form a mat M and the a plural number of units consisting of the mold panel (10) and said mat M were piled putting spacers (thickness 12 mm) between said units in multistage (10 to 15 stages) as shown in FIG. 10 and then said units piled in multistage were introduced into the compression machine (24) to be pressed between the lower base plate (24A) and the upper base plate (24B), and the fixing arm (24C) of said upper base plate (24B) was clamped to the fixing flange (24D) of said lower base plate (24A) with the clamping rod (24E). In this case, pressing pressure is settled to be 6 MPa.

As described above, a plural number of said mats M piled were pressed by the compression machine (24) and put on the truck (25) to be introduced into the heating chamber to be heated at a temperature in the range of between 180 and 250° C. for about 60 to 90 minutes. After being heated, said mats were extruded from said heating chamber with the truck (25) and kept at room temperature for 2 to 3 hours maintaining its pressed state to be cooled to 100° C. After cooling, the pressure was released to take out the resulting formed mats M' as a board shaped test piece 5.

EXAMPLE 6

Figure 13:
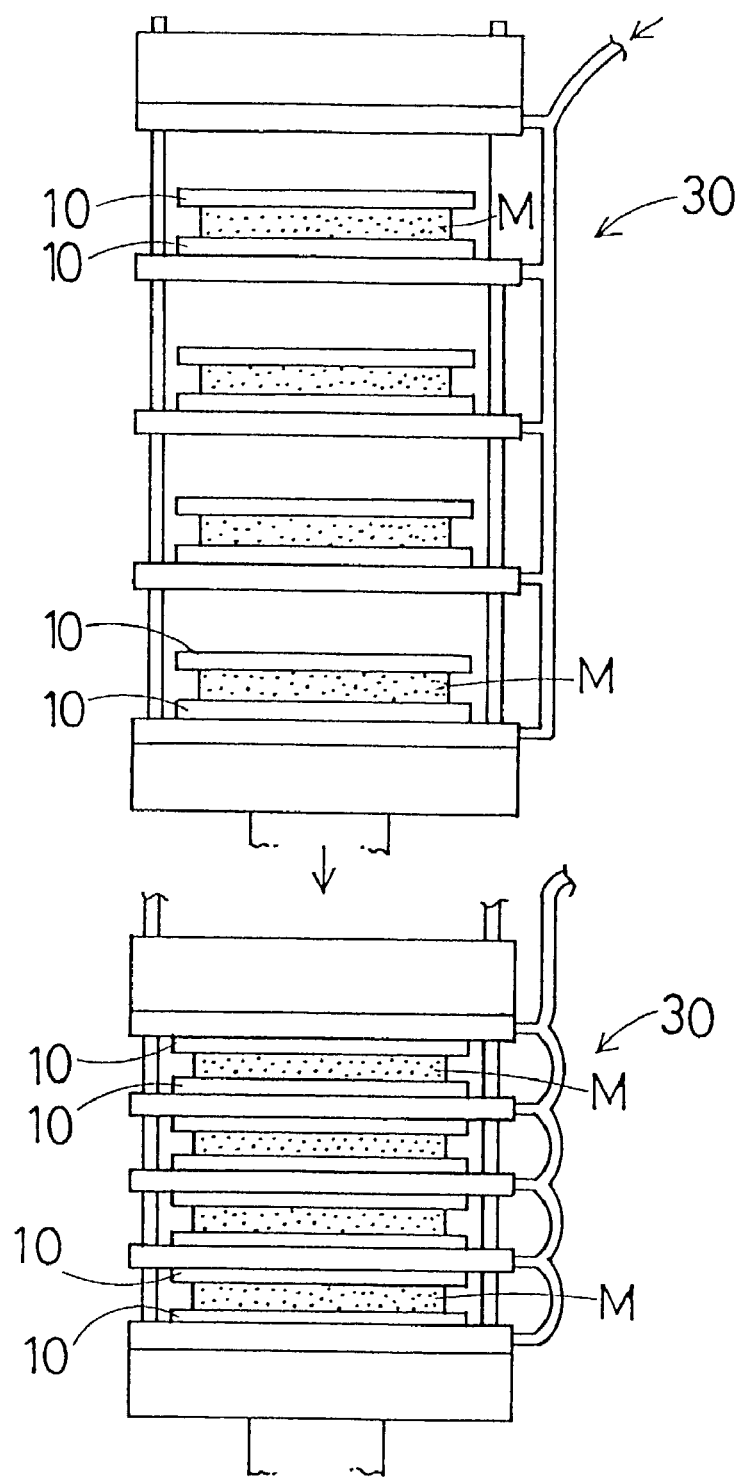
Figure 14:
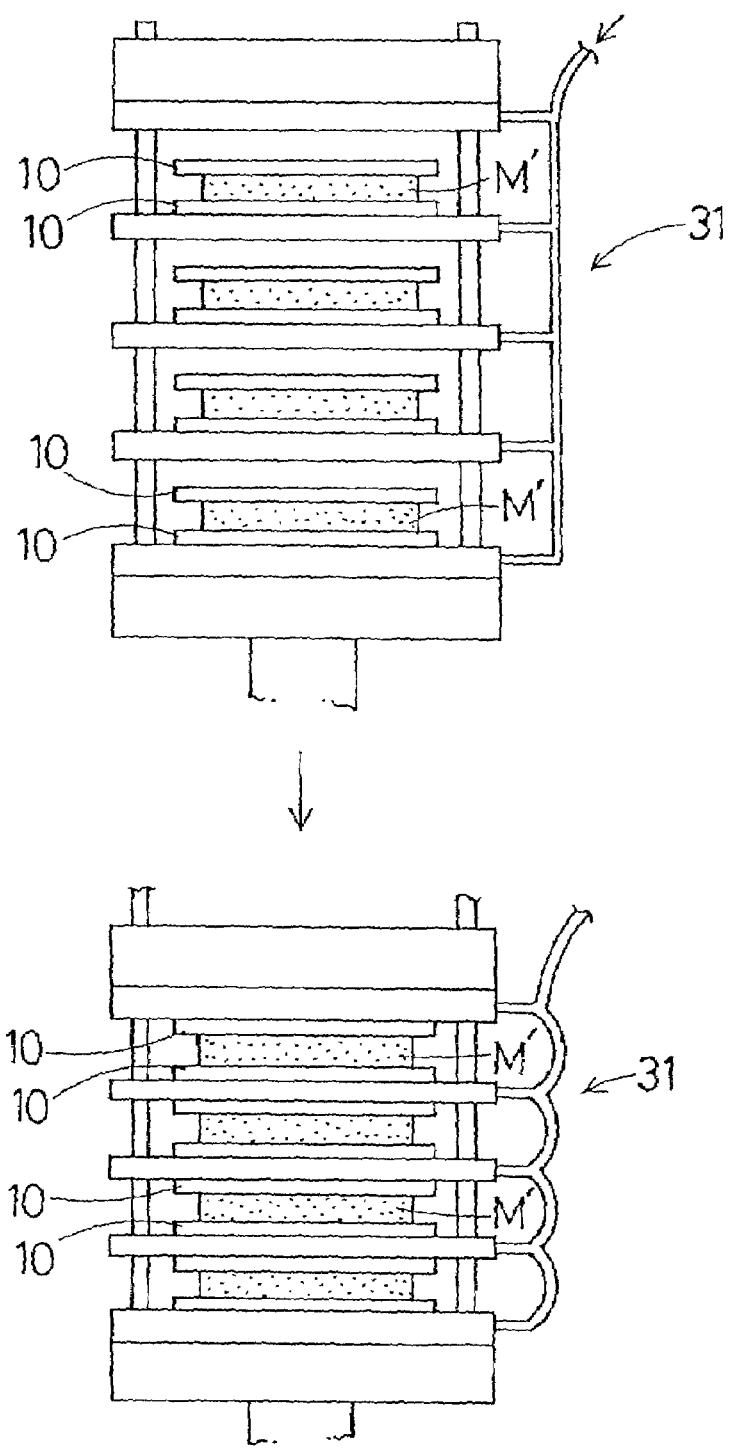

Said mixture A prepared in EXAMPLE 1 was strewed on the mold panel (10) to form a mat M and the other mold panel (10) was put on said mat M, and a plural number of units consisting of a pair of said mold panels (10) and said mat were inserted in the multistage hot-pressing machine (30) as shown in FIG. 13 and press-molded by heating at a temperature in the range of between 180 and 250° C., pressure 6 MPa. After press molding, the pressure was released and the resulting formed mats M' with mold panels (10) were inserted into the cold press (31) as shown in FIG. 14 to be cooled arranging the shape under pressure 0.5 MPa to prepare a board shaped test piece 6.

EXAMPLE 7

Using raw materials described in EXAMPLE 2, the mixtures having compositions as described below were prepared.

| | |
|---|---|
| Mixture used for surface layers | |
| Resin | 50% by weight |
| Wood flakes | 25% by weight |
| Mixture used for core layers | |
| Resin | 30% by weight |
| Wood flakes | 70% by weight |

Said mixture used for surface layers was strewed on the mold panel (10) on the moving roll conveyer and said mixture used for core layer was strewed on said strewed mixture used for surface layers and further said mixture used for surface layers was strewed on said strewed mixture for core layer to form a mat M having three layers structure. Said mat M was hot-pressed in the range from 120 to 170° C. in the same manner as in EXAMPLE 2 and cooled to prepare a board shaped test piece 7 having three layer structure.

Physical properties of said test pieces 1 to 7 were shown in table 1.

TABLE 1

| board shaped test piece | | breaking strength × $10^3$N *1 | bending strength N/mm² *1 | flexibility mm *1 | specific gravity | holding strength N *2 | water absorption 24 hr-% *3 | thickness swelling rate by water absorbing 24 hr-% *3 |
|---|---|---|---|---|---|---|---|---|
| EXAMPLES | 1 | 0.96 | 26.00 | 3.8 | 0.63 | 700 | 16 | 3.1 |
| | 2 | 0.98 | 27.00 | 3.5 | 0.65 | 720 | 19 | 3.2 |
| | 3 | 1.00 | 30.00 | 2.9 | 0.68 | 750 | 18 | 3.2 |
| | 4 | 0.95 | 25.00 | 4.3 | 0.62 | 650 | 16 | 3.1 |
| | 5 | 0.97 | 26.00 | 4.0 | 0.63 | 710 | 18 | 3.1 |
| | 6 | 0.95 | 25.00 | 3.6 | 0.64 | 700 | 17 | 3.2 |
| | 7 | 1.30 | 34.00 | 3.4 | 0.71 | 800 | 18 | 3.1 |

*1 following JISA1408
*2 following ASTMD1037 (using nail: 3φring nail)
*3 following JISA5905

EXAMPLE 8

In the apparatus shown in FIG. 19, 500 orifices (43) were arranged in one line, the caliber $\phi_1$, of each orifice being 1.5 mm, and the interval between said orifices was 5 mm and a pair of said orifices line were arranged in said die (52), interval between said orifices lines being 50 mm.

Waste articles made of polypropylene were crushed and heated and melted in the extruder to supply to said die (52) and said melted polypropylene R was extruded from said orifices (43) in a fibrous state. Said melted, extruded polypropylene R was stretched and thinned by blowing hot wind heated at 200° C. After said stretching and thinning, the diameter of the resulting fibrous polypropylene was about 0.5.

As woody material W, wood flakes which were prepared by scrapping of wood thinned out (size; width 4 to 8 mm, length 20 to 25 mm, thickness 0.5 to 1 mm) were used. Said woody material W was put on a pair of supplying conveyers (46, 46) and supplied to said melted, extruded polypropylene R from both sides with strewing rolls (47) and said melted, extruded fibrous polypropylene R was intertwined with said wood flakes W, and said melted, extruded polypropylene and said wood flakes were uniformly mixed and accumulated on the mold panel (10) on the conveyer (48) to form a mat. Mixing weight ratio of said wood flakes to said polypropylene was settled to be 6:4. The resulting mixture Mx accumulating on said mold panel was molded into board shape with the milling roll press and then cooled with the cold roll press to produce a woody article. Size of said woody formed article sample was width 100 cm, length 180 cm, thickness 12 mm and bending strength of said sample was 340 kgf/cm², and specific gravity in completely drying state was 0.71.

EXAMPLE 9

Figure 22:
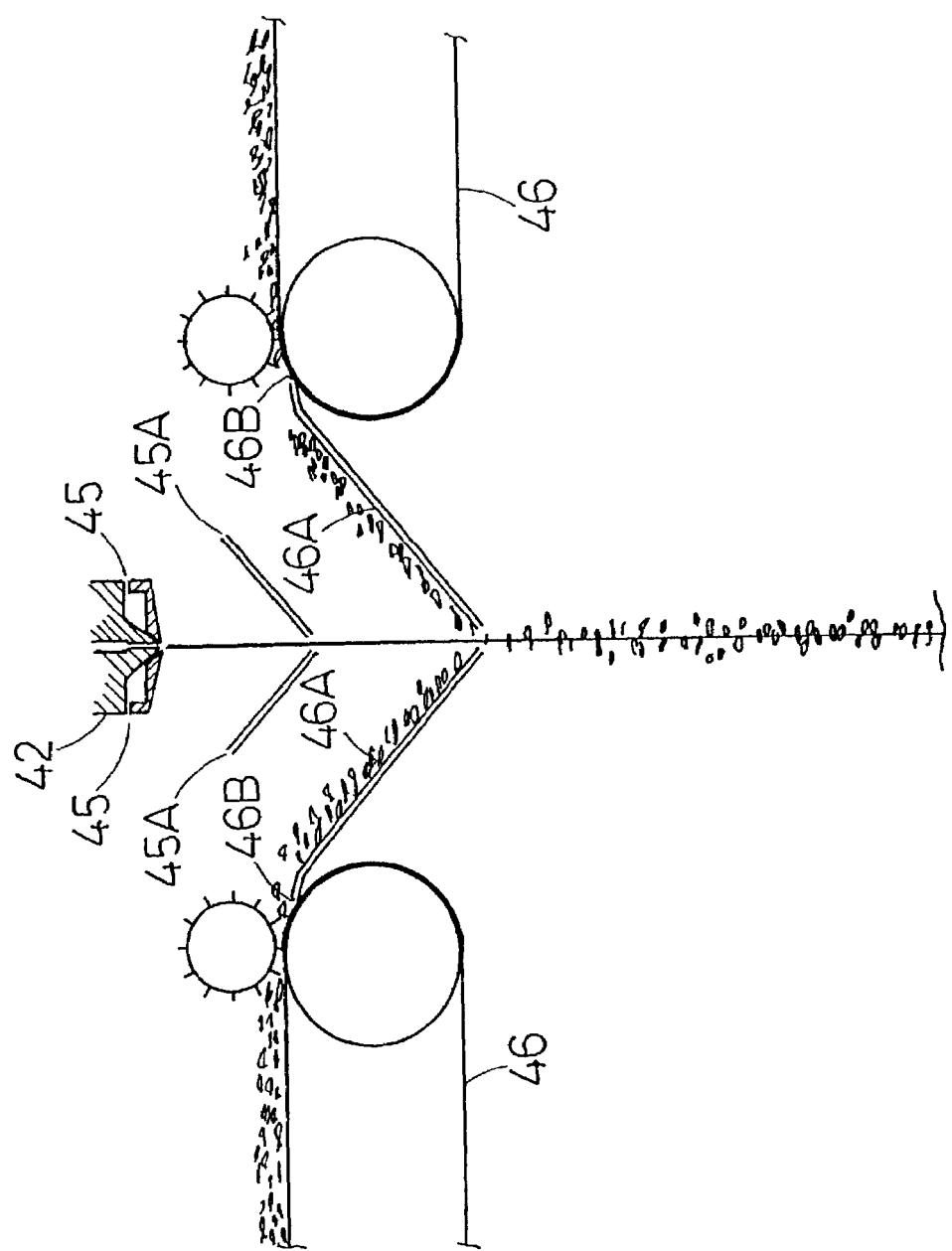

In the apparatus shown in FIG. 22, the same die, the same kind of thermoplastic resin R, and the same kind of woody material W as used in EXAMPLE 8 were used and hot wind at 200° C. was blown against melted, extruded thermoplastic resin R in two stages from the hot wind supplying paths (45, 45A) and then cold wind at 20° C. from the cold wind applying path (46B) was blown against said thermoplastic resin R to stretch and thin. In this case, the diameter of the nozzle was 1.5 mm and the diameter of fibrous thermoplastic resin R after stretching was about 0.1 mm.

After said thermoplastic resin R and said woody material W were mixed together, said mixture was hot-pressed at 200° C. with the hot-press machine (pressing pressure 6.0 MPa) and then, the resulting formed mixture was arranged in shape with the cold press (pressing pressure 0.6 MPa, gap of rolls 12 mm) to produce a woody formed article (width 100 mm, length 180 mm, thickness 12 mm). Bending strength of said woody formed article was 350 kg/cm², and specific gravity in completely drying state was 0.71.

EXAMPLE 10

In the apparatus shown in FIG. 21, the same die, the same kind of thermoplastic resin R, and the same kind of woody material W as used in EXAMPLE 8 were used, and only cold wind at 20° C. was blown against melted, extruded thermoplastic resin R from the cold wind applying path (46B), stopping hot wind from the hot wind applying path (45) of the die, thus, said melted, extruded thermoplastic resin R was stretched and thinned. In this case the diameter of the nozzle was 1.5 mm, and the diameter of fibrous thermoplastic resin after stretching was 0.6 mm.

After said thermoplastic resin R and woody material W were mixed together, said mixture was hot-pressed at 200° C. with the hot-press machine (pressing pressure 6.0 MPa) and then, the resulting formed mixture was arranged in shape with the cold press (pressing pressure (0.6 MPa) to produce a woody formed article. Bending strength of said woody formed article was 360 kg/cm², and specific gravity in completely drying state was 0.78.

As a comparison, crushed waste article made of polypropylene (powder) and wood flake W were mixed and said mixture was hot-pressed to produce a woody formed article. Bending strength of said woody formed article was 160 kgf/cm², lower than bending strength of woody formed articles produced in EXAMPLES. The reason why bending strength in the comparison was lower than those in EXAMPLES seems that crushed waste articles (powder) disperse incompletely in the mixture and there are some parts in which resin component does not exist between woody materials.

POSSIBILITY OF INDUSTRIAL USE

Since fibrous or ribbon-shaped thermoplastic resin which is easily intertwined with woody material is used as a binder of woody material in the present invention, said woody material and fibrous or ribbon-shaped thermoplastic resin are uniformly mixed together without separation and air can be put in during mixing.

Further said fibrous or ribbon-shaped thermoplastic resin is intertwined with said woody material and melted to adhere to said woody material so that a high formed and light article having a high strength, a lot of voids existing in said formed article can be provided.

Furthermore in a case where woody material is supplied to said heated and melted fibrous thermoplastic resin, said thermoplastic resin uniformly disperses in woody material to produce a woody formed article having a high strength.

In particular, in a case where said heated and melted fibrous thermoplastic resin is stretched and thinned by hot wind pressure and/or cold wind pressure, said woody material and said thermoplastic resin are more uniformly mixed so that a woody formed articles having higher strength can be provided.

Said woody formed article of the present invention is useful as building boards and material for furniture such as wall boards, floor boards, roof sheathings, seat panels of a chair, table panels and the like, and car interiors such as door trim, rear parcels and the like.

The invention claimed is:

1. A woody formed article produced by molding a raw material mixture prepared by mixing woody material, and fibrous and/or ribbon-shaped thermoplastic resin in a heated and melted state.

2. A woody formed article in accordance with claim 1 wherein said fibrous and/or ribbon-shaped thermoplastic resin is (are) made of waste articles of said thermoplastic resin.

3. A woody formed article in accordance with claim 1, wherein said woody material is wood flake.

4. A method for producing a woody formed article comprising press-molding a mat of raw material mixture containing woody material and fibrous and/or ribbon-shaped thermoplastic resin in a heated and melted state.

5. A method for producing a woody formed article comprising a strewing raw material mixture containing woody material and fibrous and/or ribbon-shaped thermoplastic resin in a heated and melted state to form a mat on a conveyer moving to a designated direction or on a mold panel set on said conveyer and press-molding said mat.

6. A method for producing a woody formed article in accordance with claim 4, wherein an uneven pattern is formed on one side or both sides of said mat by embossing after said press-molding.

7. A method for producing a woody formed article comprising press-molding a mat of raw material mixture containing woody material and fibrous and/or ribbon-shaped thermoplastic resin wherein heated and melted thermoplastic resin is extruded from an orifice of an extruder's die in fibrous and/or ribbon shape and said extruded, fibrous and/or ribbon shaped thermoplastic resin extruded from orifice is mixed with said woody material in melted state.

8. A method for producing a woody formed article in accordance with claim 7, wherein said woody material is continuously supplied to and mixed in said heated and melted thermoplastic resin from one side or both sides.

9. A method for producing a woody formed article in accordance with claim 7, wherein said heated and melted thermoplastic resin is extruded from said orifice of said extruder's die and stretched and thinned by air that is either heated or cooled and said stretched and thinned fibrous thermoplastic resin is mixed with said woody material in a melted state.

10. A method for producing a woody formed article comprising press-molding a mat of raw material mixture containing woody material and fibrous and/or ribbon-shaped thermoplastic resin wherein plural numbers of orifices of an extruder's die are arranged in one row or a plural number of rows.

11. A method for producing a woody formed article comprising press-molding a mat of raw material mixture containing woody material and fibrous and/or ribbon-shaped thermoplastic resin wherein a plural number of dies are arranged in plural stages.

12. A method for producing a woody formed article comprising press-molding a mat of raw material mixture containing woody material and fibrous and/or ribbon-shaped thermoplastic resin wherein an orifice of an extruder's die for said thermoplastic resin has a caliber in the range of between 0.2 and 2.0 mm.

13. A method for producing a woody formed article in accordance with claim 4, wherein said fibrous or ribbon-shaped thermoplastic resin is made of waste articles of said thermoplastic resin.

14. A method for producing a woody formed article in accordance with claim 4, wherein said woody material is wood flakes.

* * * * *